(12) United States Patent
Khosrozadeh et al.

(10) Patent No.: US 12,741,875 B2
(45) Date of Patent: Sep. 22, 2026

(54) ACTIVATED CARBON PRODUCTION AND METHODS THEREFOR

(71) Applicant: Atlas Power Technologies Inc., Abbotsford (CA)

(72) Inventors: Ali Khosrozadeh, Abbotsford (CA); Behzad Gorji Pour Shafiee, Abbotsford (CA); Mohsen Sadeghi, Abbotsford (CA); Omar Khaled Omar Bin Gah, Abbotsford (CA); Mitchell Miller, Mission (CA)

(73) Assignee: Atlas Power Technologies Inc., Abbotsford (CA)

( * ) Notice: Subject to any disclaimer, the term of this patent is extended or adjusted under 35 U.S.C. 154(b) by 37 days.

(21) Appl. No.: 19/119,085

(22) PCT Filed: Mar. 27, 2024

(86) PCT No.: PCT/CA2024/050388
§ 371 (c)(1),
(2) Date: Apr. 7, 2025

(87) PCT Pub. No.: WO2025/199606
PCT Pub. Date: Oct. 2, 2025

(65) Prior Publication Data
US 2026/0109610 A1 Apr. 23, 2026

(51) Int. Cl.
*C01B 32/348* (2017.01)
*C01B 32/318* (2017.01)
*H01G 11/04* (2013.01)
*H01G 11/24* (2013.01)
*H01G 11/34* (2013.01)

(52) U.S. Cl.
CPC .......... *C01B 32/348* (2017.08); *C01B 32/318* (2017.08); *H01G 11/04* (2013.01); *H01G 11/24* (2013.01); *H01G 11/34* (2013.01); *C01P 2004/03* (2013.01); *C01P 2004/04* (2013.01); *C01P 2006/16* (2013.01); *C01P 2006/40* (2013.01)

(58) Field of Classification Search
CPC ..... C01B 32/342; H01M 4/625; H01G 11/34; H01G 11/44; B01J 20/20
See application file for complete search history.

(56) References Cited

FOREIGN PATENT DOCUMENTS

| | | |
|---|---|---|
| CA | 3184138 | 1/2022 |
| CN | 218065676 | 12/2022 |

*Primary Examiner* — Khanh T Nguyen
(74) *Attorney, Agent, or Firm* — Damien G. Loveland; Valuetech Patent Agency Inc

(57) ABSTRACT

When potassium hydroxide (KOH) or other activating agents are used to activate carbon, the hydrochloric acid used to remove it may damage the stainless steel equipment used in the process. Herein, water and citric acid are used to wash the carbon after its activation to reduce damage to the equipment. Prior to activation, a slurry of coal, petroleum coke or other carbonaceous material mixed with water and KOH is dried in layers. During drying, the KOH repeatedly precipitates as a crust on the layers and is repeatedly blended back into the mixture. Activation temperature and duration may be selected to control the pore size distribution in the activated carbon.

56 Claims, 9 Drawing Sheets

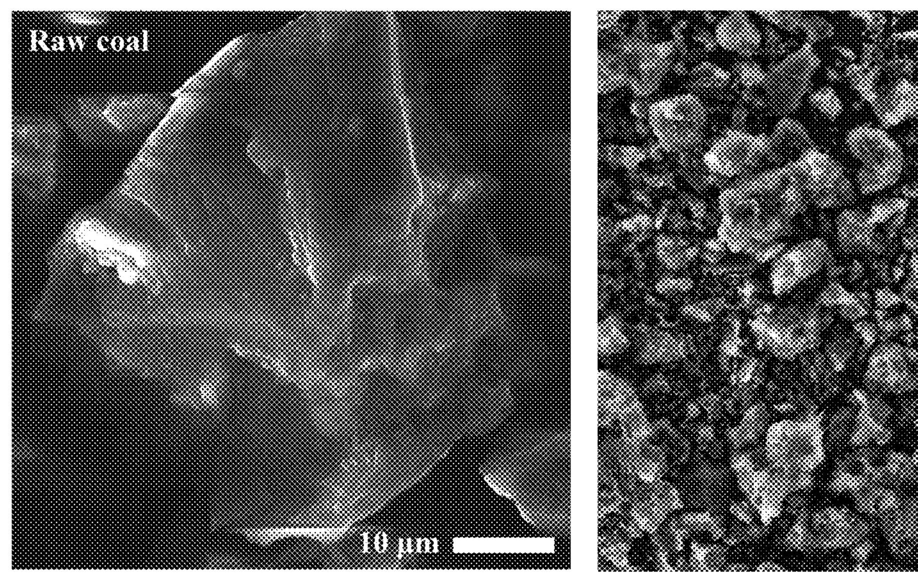
FIG. 6 (PRIOR ART)
FIG. 7
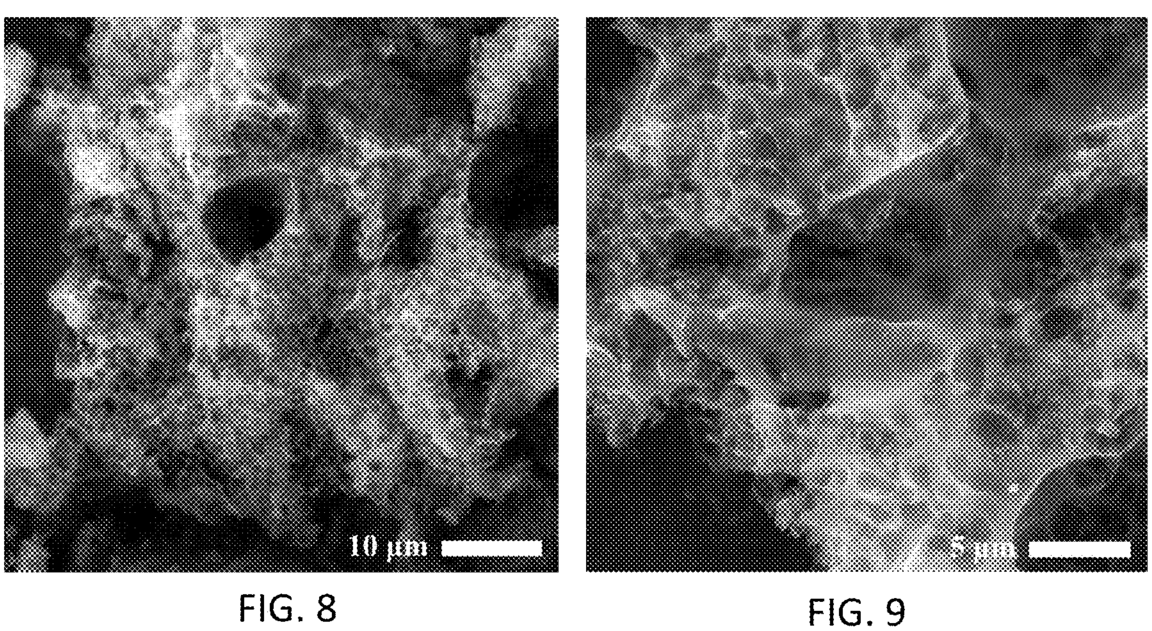
FIG. 8
FIG. 9

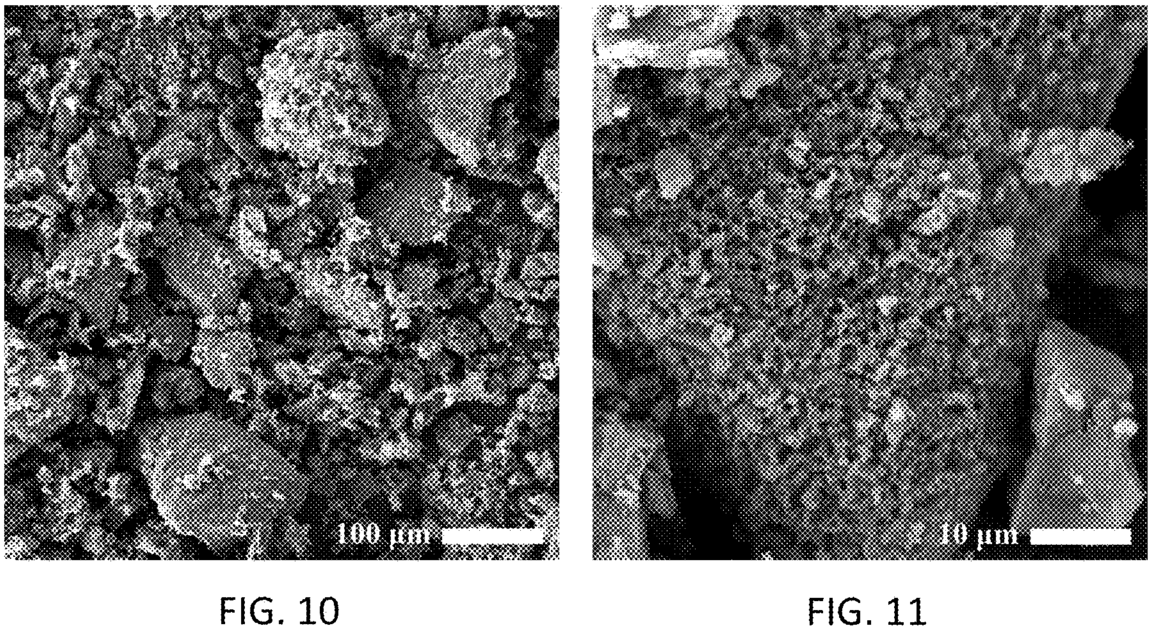
FIG. 10
FIG. 11
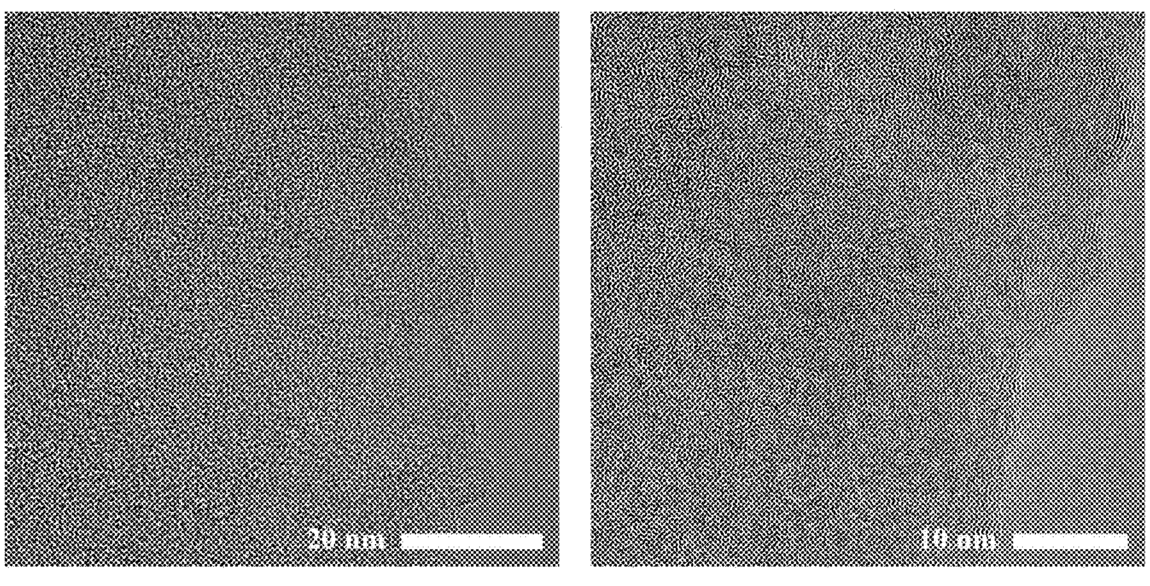
FIG. 12
FIG. 13

ACTIVATED CARBON PRODUCTION AND METHODS THEREFOR

TECHNICAL FIELD

The present disclosure is generally related to systems and methods for the production of activated carbon for tailoring activated carbon characteristics and compositions for various uses, including for energy storage devices such as supercapacitors and batteries, and particularly to improvements for activating carbon.

BACKGROUND

Activated carbon is traditionally used to trap contaminants in water or air purification processes. Activated carbon is also used in the composition of electrode materials for energy storage devices such as supercapacitors, batteries, and battery-capacitor hybrid devices. Activated carbon is a porous and electrically conductive material. For energy storage applications, the pore size distribution and hierarchical structure of activated carbon is critical in the capacitive performance of the device.

Various material sources can be used as precursors for preparing activated carbon such as coal, petroleum coke, pitches, polymers, and biomass sources (wood, plants, animal sources, agriculture by-products). Activated carbon can be prepared via physical activation, chemical activation or a combination of them in order to create tiny pores and fissures in the carbon.

In physical activation, the precursor is treated with steam, $CO_2$, air, or a combination, and at elevated temperature (600-1200° C.). Chemical activation uses one or more activating agents such as KOH, $Ca(CO_3)_2$, $H_3PO_4$, $ZnCl_2$, $Na_2CO_3$, etc. and is performed without oxygen and at high temperatures (400-1100° C.). Precursors are sometimes carbonized into carbon in an inert atmosphere at high temperatures before being used in an activation process to make activated carbon.

Potassium hydroxide (KOH) is the most common agent used for chemically activating carbon. Hydrochloric acid (HCl) and water is typically used to remove KOH, by-products, and impurities after the activation step in order to prepare a high-purity porous carbon free from contaminants that may affect the performance of energy storage devices.

Recently, in the manufacture of energy storage devices such as supercapacitors, electrode layers with activated carbon are being applied to the current collector foils as a dry film, generally referred to as a free-standing film. In technologies such as electric vehicles and grid-scale applications, there is an increasing need for supercapacitors and energy storage devices with both higher energy density and high-power capability. For energy storage devices, the pore size distribution and hierarchical structure of activated carbons are critical in the capacitive performance of the device, which can be tuned in the manufacturing process. Energy storage devices may include batteries, capacitors, supercapacitors, and capacitor-battery hybrids, for example.

Electrode and electrolyte are key elements that define the performance of supercapacitors (SCs) and thus are important to manufacture low-cost SCs with high energy density. On the electrode side, activated carbons (ACs) derived from various sources are the most widely used electrode materials for commercial SCs owing to their high double-layer capacitance, low cost, high specific surface area, chemical stability, high electrical conductivity, and controllable porosity.

A supercapacitor device is commonly composed of two electrodes separated by an ion permeable separator, an electrolyte ionically connecting both electrodes, and two current collectors directly attached to electrodes. Designing a supercapacitor requires the selection of proper electrode materials, electrolytes, separators, current collectors, cases, assembly methods, and seals.

This background is not intended, nor should be construed, to constitute prior art against the present invention.

SUMMARY OF INVENTION

The present invention is directed to a process to make the activated carbon from carbon source materials such as at least one or more coal, coke, biomass sources (wood, plants, etc.), and polymers. A precursor such as coal, coke, biomass, or the like is mixed with KOH which may include water. The mixture is dried while stirring repeatedly to blend the crust of KOH that forms back into the mixture. The mixture is activated in a furnace in an inert medium and then washed alternately with citric acid and water.

The disclosed is a system and method to produce activated carbon and to optionally increase the storage capability and performance of this type of porous carbon by enhancing its structure and accessible surface area. This is accomplished by tuning the pore size distribution and hierarchical structure of the activated carbon, which has been designed based on the feed material composition and for an appropriate electrolyte.

A typical activated carbon may have a broad pore size distribution including micropores (pores <2 nm), mesopores (pores 2-50 nm), and macropores (pores >50 nm). The type of precursor and the activation approach define the pore size distribution and the shape and hierarchical structure of pores. Another important benefit of the disclosed system and method, in the design of SCs, is the adaptability of the design of the activated carbon electrode with varying electrolytes. One aspect of the disclosed invention is to maximize the accessible surface area of ACs (hierarchical structure) by matching the porosity with an electrolyte, or variety thereof, ('ion-pore matching') to improve the performance of the SC.

One embodiment of the invention describes producing an activated carbon by fine-tuning the pore size distribution, specific surface area, conductivity, and surface functional groups based on controlling and varying a few non-limiting examples of: type of activating agents, the activating agent to carbon source ratio, doping agents, saturation method and mixing technique, particle size of carbon source (milling, grinding, sorting, sifting), saturation method of activating agent with precursor and mixing technique, activation temperature and activation profile (rise rate, activation time period, cooling time period), washing method and chemicals used during washing or treatment, and final drying, to attain superior electrochemical performance for energy storage devices.

In order to allow a heightened wettability, intercalation, saturation, and penetration of their desired electrolyte into a pre-designed activated carbon, as well as the ion permeable separator(s), and in order for activated carbon pores to synergistically couple to an electrolyte based on ion(s), solvated ion(s), and solvation shell sizes of an energy storage devices such as a supercapacitor, developing a complete end-to-end manufacturing process to accomplish the aforementioned material processing controls and resultant material features, is described herein, and is accomplishable safely with a low-cost manufacturing process.

Disclosed is a process for manufacturing activated carbon, comprising the steps of: mixing a powder of carbonaceous source material with water and KOH to form a mixture; drying the mixture at a temperature of 20° C. to below 400° C.; stirring the mixture repeatedly during the drying step; heating the dried mixture to 450-1300° C. under an inert atmosphere to result in an activated mixture; washing the activated mixture in further water to remove some or all of the KOH; washing the activated mixture with citric acid; and drying the washed activated mixture to result in the activated carbon.

Also disclosed is a process for manufacturing activated carbon, comprising, in order, the steps of: mixing a powder of carbonaceous source material with an activating agent to form a mixture; drying the mixture at a temperature of 20° C. to below 400° C.; stirring the mixture repeatedly during the previous step; heating the dried mixture to 450-1300° C. under an inert atmosphere to result in an activated mixture; washing the activated mixture in water to remove some or all of the activating agent; washing the activated mixture with a washing agent; washing the activated mixture with additional water; and drying the washed activated mixture to result in the activated carbon.

The present disclosure also provides for a system and method for a manufacturing process for activated carbon. The present invention may utilize in some embodiments a multi-step process in order to produce energy storage devices or components, which includes producing activated carbon material from a carbon source feedstock with a specific pore size distribution to ensure ion and pore matching between activated carbons and electrolytes in energy storage devices. Herein, the process and description provided describes KOH-activated carbons as an example of the embodiments, in additional embodiments alternative activating agents may also be used.

This disclosure will enable one skilled in the art to make and use the described invention, it describes several alternate embodiments, adaptations, variations, alternatives, and uses of the disclosure. These and additional embodiments, features, and advantages of the present disclosure will become more apparent to those skilled in the art when taken with reference to the detailed description of this disclosure and in conjunction with the accompanying FIGURES.

This summary provides a simplified, non-exhaustive introduction to some aspects of the invention, without delineating the scope of the invention.

BRIEF DESCRIPTION OF DRAWINGS

The following drawings illustrate embodiments of the invention and should not be construed as restricting the scope of the invention in any way.

FIG. 6 is an SEM (scanning electron microscopy) image of raw coal (prior art).

FIGS. 7-9 are SEM images of activated carbon produced from coal by a process of the present invention.

FIGS. 10-11 are SEM images of activated carbon produced from petroleum coke by a process of the present invention.

FIGS. 12-13 are TEM (transmission electron microscopy) images of activated carbon produced from petroleum coke by a process of the present invention.

DETAILED DESCRIPTION

1. Glossary

Figure 1:
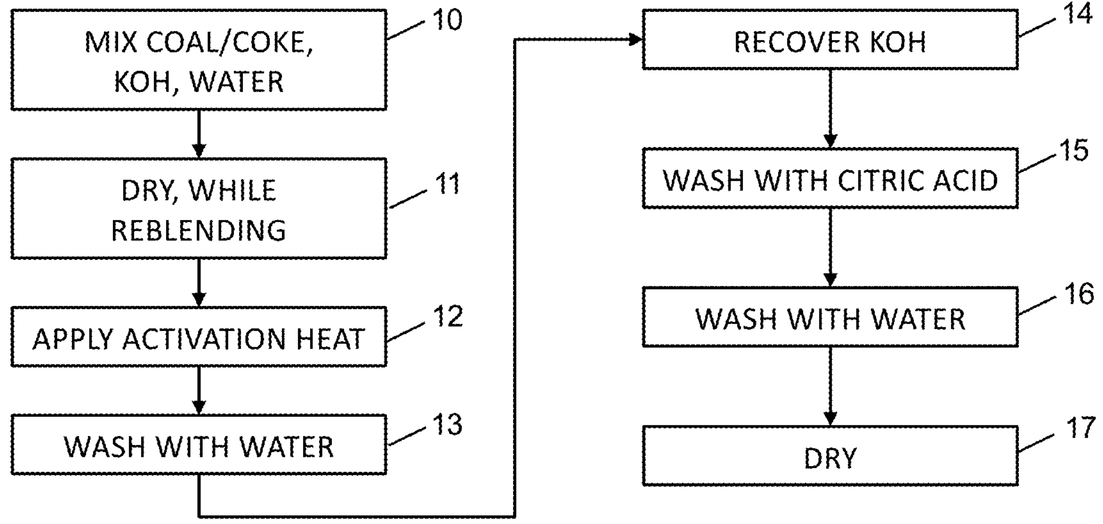
FIG. 1 is a flowchart showing some of the main steps of a process for making activated carbon, according to an embodiment of the present invention.

Activating agent: also called chemical activating agent, a chemical compound that reacts with carbon at high temperatures in an inert medium to create pores in carbon.

AC—activated carbon: a form of carbon that is processed or activated to have tiny pores and have high surface area.

Activation: also called chemical activation; typically done by mixing carbonaceous materials with chemical activating agents, followed by the carbonization at high temperature in an inert medium, generating pore networks in carbons. This process results in activated carbons with high specific surface area and large pore volume, where the pores generally include micropores and mesopores. Activation may be chemical/thermal, physical, or combination for example.

ASTM—American Society for Testing and Materials

Carbon source: also called raw material, feed material, carbon source material, carbonaceous material or precursor, is a carbon-rich material having certain amounts of carbon or that can be converted to carbon. For present descriptive purposes, the term "carbon source" is intended to mean a material (whether a feedstock, product, or intermediate) that contains a carbon element, which may be renewable on time scales of days, months, years, decades, centuries, thousands of years, millions of years, or longer time scale.

A carbon source as provided herein would normally contain greater than about half its weight as carbon, where biomass has generally no greater than about 50 percent by weight. Depending on a specific feedstock composition, a carbon source will contain at least 40 percent by weight, at least 45 percent by weight, at least 50 percent by weight, at least 55 percent by weight, at least 60 percent by weight, at least 65 percent by weight, at least 70 percent by weight, at least 75 percent by weight, at least 80 percent by weight, at least 85 percent by weight, at least 90 percent by weight, at least 95 percent by weight, at least 96 percent by weight, at least 97 percent by weight, at least 98 percent by weight, at least 99 percent by weight carbon.

Notwithstanding the foregoing, the term "carbon source" is used herein for practical purposes only and to describe materials that may be processed to produce the systems of the disclosure, in various alternative embodiments. Limitations with respect to specific carbon content, or concentrations or compositions, shall not be implied from use of the term itself but rather only by reference to a particular embodiment(s) and/or equivalents thereof. For example it will be understood that a material having low initial carbon content, and subjected to the disclosed system and method, may produce a carbon source that is highly improved as a carbon source relative to the starting material which may offer a high yielding carbon source, but regardless of a relatively low carbon source starting material with a low purity of carbon, which may include a carbon source that is less than or equal to about 50 percent by weight of carbon. Carbon sources shall also be construed as any feedstock or mixture that contains or may be converted to carbon. Elementally, a carbon source may include carbon, hydrogen, and oxygen. The system and method and device of this disclosure may accommodate a wide range of feedstocks of various types, sizes, and moisture contents.

Carbon sources may include, for example, plant and plant derived material, vegetation, agricultural waste, forestry waste, wood waste, paper waste, animal-derived waste, poultry derived waste, and municipal solid waste, biomass, timber harvesting residues, softwood chips, hardwood chips, tree branches, tree stumps, knots, leaves, bark, sawdust, paper pulp, cellulose, corn, corn stover, wheat straw, rice straw, sugarcane bagasse, switchgrass, miscanthus, animal manure, municipal garbage, municipal sewage, commercial waste, grape pumice, almond shells, pecan shells, coconut shells, coffee grounds, grass pellets, hay pellets, wood pellets, cardboard, paper, carbohydrates, plastic, and cloth, carbon containing feedstocks other than biomass, such as fossil fuels, coal, petroleum coke, or any mixtures of biomass and fossil fuels such as biomass and coal blends. In exemplified embodiments, a carbon source feedstock is, or includes, coal, oil shale, crude oil, asphalt, or solids from crude oil processing such as petroleum coke. Carbon sources may include waste tires, recycled plastics, recycled paper, and other waste or recycled materials.

FTIR—Fourier Transform Infrared Spectroscopy

Macropore—Throughout the disclosure the term "macropore" refers to a pore with a diameter above 50 nm.

Mesopore—Throughout the disclosure the term "mesopore" refers to a pore with a diameter from about 2 nm to about 50 nm.

Micropore—Throughout the disclosure the term "micropore" refers to a pore with a diameter less than about 2 nm.

Pyrolysis—and "pyrolyze" are generally used to refer to thermal decomposition of a carbonaceous material. In pyrolysis, lesser amounts of oxygen are present than are required for a complete combustion of material to occur, such as or equal to about 30% less, about 20% less, about 10% less, or equal to or about 5% less, or equal to or about 1% less, or equal to or about 0.5% less, or equal to or about 0.1% less, or equal to or about 0.01% less of oxygen that is required for the combustion to occur. In additional embodiments, pyrolysis may be performed in the absence of oxygen.

Physical changes that may occur during pyrolysis may include any of the following: (i) heat transfers from a heat source and increases the temperature of the feedstock material; (ii) the pyrolysis reactions at a higher temperature may release volatiles and form a char; (iii) the flow of heat from volatiles into cooler solid feedstock results in a heat transfer between hot volatiles and cooler un-pyrolyzed or partially pyrolyzed feedstock; (iv) condensation from volatiles within cooler parts of the feedstock, which may be followed by secondary reactions, may produce a tar; (v) autocatalytic secondary pyrolysis reactions may proceed while or in simultaneity as primary pyrolytic reactions occur; and may cause (vi) further thermal decomposition, reformation, water and gas shift reactions, free-volatile recombination, and/or dehydration can and may also occur, some may be a function of or effected by the residence time, temperature(s), and pressure.

Pre-determined pore configuration activated carbon—this refers to activated carbon with a distribution of pore sizes that is controlled to at least some extent during the manufacturing of the activated carbon. Control of the pore size distribution is at least in part achieved by selection of the activation temperature and duration of the activation.

Pyrolysis may be used to at least partially dehydrate a feedstock. In additional embodiments, pyrolysis removes greater than or about 50%, greater than or about 75%, greater than or about 90%, greater than or about 95%, greater than or about 99% of the water from the feedstock.

Reagent—For present descriptive purposes, the term "reagent" is meant in its broadest sense; a reagent may be a fuel, chemical, material, compound, additive, blend of components, solvent, or other. A reagent is not necessarily a chemical that causes or reacts in a chemical reaction. A reagent may, or may not be, a chemical reactant, which may or may not be consumed in a specific reaction. A reagent which may be a chemical catalyst for a specific reaction. A reagent may cause or be used in adjusting a mechanical, physical, or hydrodynamic element of a material to which the reagent may be a part off.

SEM—scanning electron microscopy

SC—supercapacitor

TEM—transmission electron microscopy

2. Exemplary Processes

Referring to FIG. 1, the main steps of a process for activating carbon are shown for brevity. Referring to step 10, the KOH is mixed with the carbon source, preferably a fine powder, by impregnation with KOH aqueous solution. When utilizing an impregnation method, water should be evaporated before the activation step. The carbon source may be coal, such as thermal coal for example. Additionally, the coal used may be lignite, bituminous, sub-bituminous, or anthracite as a few non-limiting examples. Petroleum coke may also be used in certain embodiments. Other carbonaceous source materials may be used as precursor for making activated carbon, such as polymers, petroleum pitch, and natural biomass sources (wood, plants, bamboo, coconut husk, willow peat, agriculture by-products, and animal sources). In some embodiments, various structured carbons may be used as a source for activation, such as carbon fiber, hard carbon, graphene, and graphite. The source material may be pre-carbonized and washed or used without washing. The mixing step results in a mixture that is a thick slurry or sludge.

In step 11, the mixture from the previous step is spread out and dried. During drying, the mixture is repeatedly stirred in order to blend the KOH crust that forms back into the mixture and allow the exposure of the wet or moist components of the mixture to dry in heated and circulating air. The mixture may be further ground before additional drying. In some embodiments, KOH is mixed with the powdered carbon source physically without water, for example by combining two fine powders. The dried mixture is then heated in a furnace under an inert medium, wherein a controlled ramping rate of heat may be used, then the dried mixture may be held at a certain temperature for a certain duration, followed by cooling down the mixture.

In step 12, the dried mixture is activated by heating it to a high temperature in a furnace, ideally a rotating furnace, such as a rotating tube furnace, or a furnace that allows continuous mixing of the mixture, under an inert atmosphere such as nitrogen.

In step 13, the resulting activated carbon is then washed once or repeatedly with water to remove the KOH and recover it in step 14 for later use.

In step 15, the resulting activated carbon is then washed once or repeatedly with an aqueous solution of citric acid to remove the KOH residuals, by-products, and impurities.

In step 16, the activated carbon is then washed once or repeatedly with water to remove the citric acid residuals.

In step 17, the activated carbon is then dried.

Figure 2:
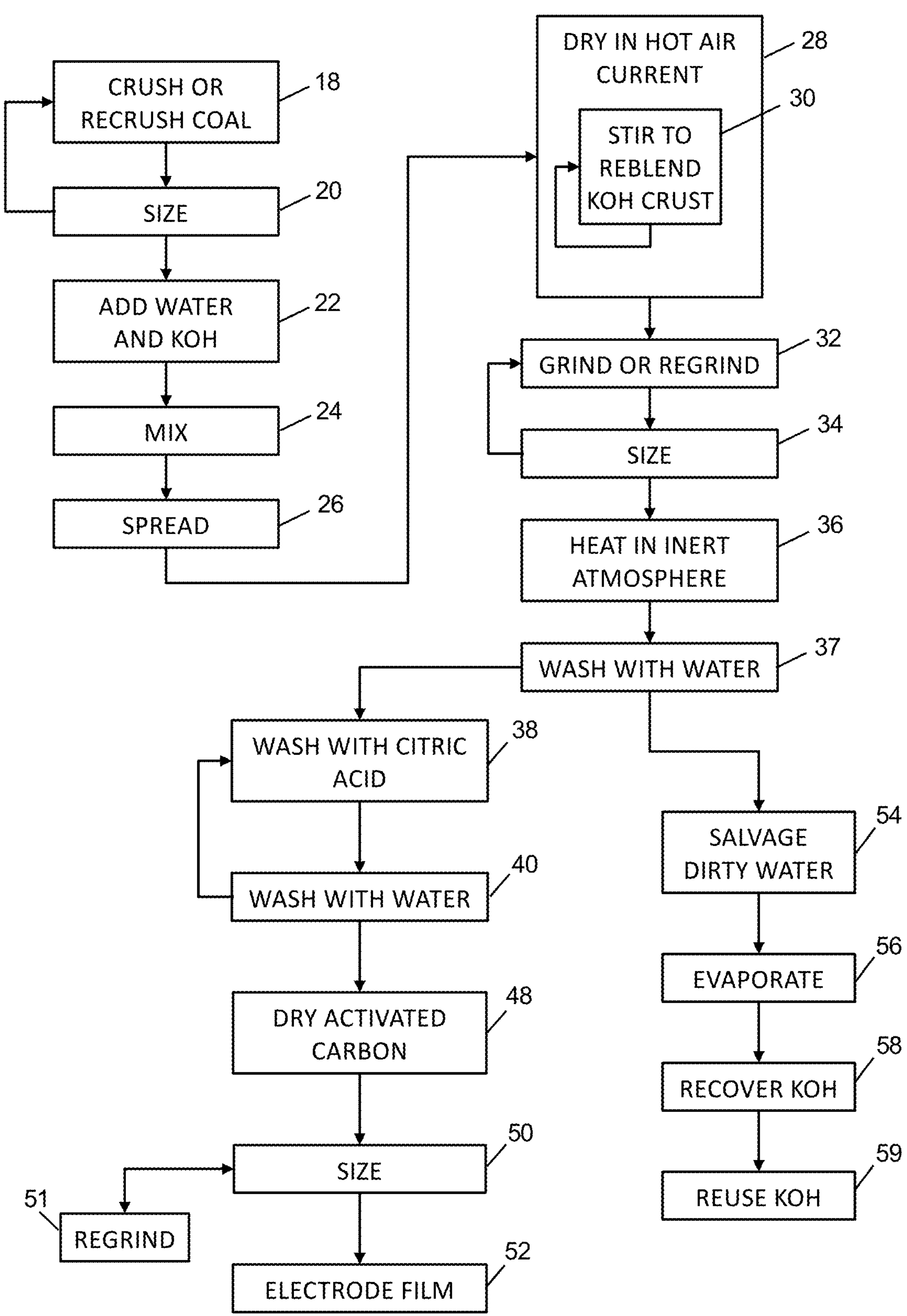
FIG. 2 is a flowchart showing more steps of a process for making activated carbon, according to an embodiment of the present invention.

Referring to FIG. 2, the process for activating carbon is shown in more detail. In step 18, the raw material is ground, milled, crushed or otherwise pulverized. The raw material in certain embodiments is thermal coal, petroleum coke, biomass, or other suitable carbon-rich source and/or a mixture. In some embodiments, the raw material is reduced to a particle size of less than 250 μm. In some embodiments, the raw material is ground in stages, gradually reducing the particle size.

In step 20, the ground raw material may be sized, for example by passing it through a sieve. The sieve may be a vibrating sieve, for example. In some embodiments, a series of sieves of decreasing mesh size may be used instead of a single sieve with a single mesh size. Depending on the hole size of the used mesh, the particle size may range from 1 to 250 μm. In certain embodiments the ground material that is too large to pass through the sieve may be re-crushed in step 18, and then resized.

In step 22, KOH is dissolved in water and then added to the ground raw material (source). The form of the KOH may be other than granules, for example it may be flakes, pellets, powder or a pre-mixed solution. In some embodiments, the KOH may first be dissolved in the water (pre-mixed) before adding it to the ground raw material. In some embodiments, the water may be added to the raw material before the KOH. The amount of activating agents used may be significantly more than the amount of ground raw material in certain embodiments. For example, the mass ratio of KOH to the raw material may be between 1:1 and 10:1. Depending on the type of carbon source and the type and form of activation agents, up to 20 times the water may be used than the amount of KOH, by weight. In some embodiments, an additive such as an organic solvent may be added to the mixture to improve the wetting of the carbon source. The KOH is used to dehydrate and form pores and increase rugosity in the ground raw material during the later activation step.

In step 24, the water, KOH and ground raw material are mixed to form a thick slurry or sludge. Mixing continues until the mixture is homogenous. The mixer used for this mixing step may be one or more of a variety of mixers, such as a sealed vacuum blender, for example. The vacuum blender may have a central auger, for example, that rotates to mix the ground raw material, water and KOH.

In step 26, the mixture is spread out into layers on trays in preparation for drying. In certain embodiments, the layers are 15 cm or less in thickness and may be, for example, less than 3 cm thick, or about 2.5 cm thick. The thinner layers promote a faster drying. The trays may be made from stainless steel, for example. Trays made from other materials may be used provided that they do not react with the KOH. In certain embodiments it is beneficial if the trays are not made from silicone or aluminum, which may contaminate the carbon.

In step 28 the mixture, layered on the trays, is placed into a dehumidifier, or dehydrator, or convection oven. In the dehydrator, a warm or hot dry air current is blown over the layers of the mixture in order to dry the mixture, though this may be a continuous process such as a continuous conveyor. In total, the layered mixture may remain in the dehydrator for a day (24 hours), at a temperature of 40-150° C. Shorter or longer drying periods may be used depending on how effective the dehydrator is, the main requirement being that the mixture is dried. In some embodiments, various types of ovens may be used to dry the mixture. In some embodiments, the mixture may be dried inside the furnace at a temperature between 80-400° C. before the carbonization/activation which may be in an inert environment. In some embodiments, the pressure of the dehydrator may be reduced below atmospheric pressure in order to increase the rate of evaporation of moisture from the layered mixture. For example, a vacuum oven, convection, or other process may be used.

In step 30 and during the drying step, the layered mixture is stirred or re-blended from time to time. The re-blending may be performed while the layered mixture is still within the dehydrator or while it is temporarily removed. For example, the mixture may be removed from the dehydrator and blended in a blender or other mixing device. While drying, the removal of the moisture from the mixture causes a crust of KOH to form on the uppermost region of the layer. The repeated re-blending results in the KOH crust being broken up and remixed with the carbon particles, in order to maintain as homogenous a mixture as possible. After the dehumidification step, the mixture may be blended again, before the activation step. Besides homogenization, another advantage of re-blending is that it increases the rate of drying compared to simply leaving the mixture to dry without any further blending or stirring.

In step 32, which is optional, the dried mixture is ground further.

In step 34, in certain embodiments, the further ground mixture is sized, for example by passing it through a sieve. In additional embodiments, the fraction of the further ground mixture that does not pass through the sieve may be reground again, in step 32.

When the mixture has been dried, and provided that it has the desired particle size, it is ready for activation. In step 36, the dried mixture is heated at high temperature in an inert atmosphere, for example, in a box furnace. The atmosphere may be nitrogen or argon or another noble or inert gas. The atmosphere may be a combination of nitrogen or argon with steam or other gases such as $CO_2$ if the activation process is a combination of physical and chemical.

The heating is at a temperature of 400-1000° C., for a duration of 0.5 to 24 hours. Before this activation step, the inert atmosphere may be purged once or several times. While purging the atmosphere, care is taken not to allow the temperature inside the furnace to exceed 200° C. as this may cause unintended combustion of the material or a portion thereof.

In step 37, after the activation step, the activated mixture is allowed to cool and is then washed in water to recover the KOH for later use. The washing process may involve stirring the activated mixture in the water. The temperature of the water used to wash the mixture is at a temperature of 20-80° C., which may further rise. During the washing with water, which induces an exothermic reaction, the temperature may rise, depending on the amount of water used. The washing process may involve preheating the water to 20-100° C., for instance 60° C., then stirring the activated mixture in the water to allow for better recovery of KOH, which may be stored for later use.

In step 38, an aqueous solution of an acid, preferably citric acid, is added to the activated mixture followed by filtration. The molar concentration of citric acid may have a wide-ranging concentration, for example, 0.1-20 molar, to be more practical 1-2 molar. At about 2 molar or below, wetting of the activated mixture is better. The washing process may involve stirring the activated mixture in the citric acid for a period of 0.1-12 hours, or 0.5-3 hours for example. After the washing, the liquid is separated and removed from the activated mixture using filtration. The size of the sieve in the filtration depends on the particle size of the precursor (source material). The size of the sieve for filtration may be 5 μm, for example, to retain the activated carbon particles while allowing the liquid to drain off. A vacuum filtration system, and or providing a higher pressure to force the material through the filter, may be used in some embodiments. In some embodiments, citric acid may be replaced by other acids such as HCl.

In some embodiments, step 37 may be skipped and replaced with step 38, acid wash. Then, salts, such as potassium citrate, and other by-products may be optionally recovered after step 38 by evaporating water from the waste liquid.

In step 40, the activated mixture is then optionally washed with water a second time to obtain activated carbon. The temperature of the water used to wash the mixture is between 20° C. and 95° C., to be more practical 50-90° C. The washing process may involve stirring the activated mixture in the water for a period of 10 minutes to 12 hours, or passing water directly through the material while stirring, for example. After the washing, the liquid is separated and removed from the activated mixture using filtration. The size of the sieve for filtration depends on the particle size of the precursor (source material). The size of the sieve for filtration may be 5 μm, for example, to retain the activated carbon particles while allowing the liquid to drain off. A vacuum filtration system may be used in some embodiments.

Citric acid is used for the washing, rather than HCl which is typically used, though other washing agents such as alternative acids may be used. The citric acid does not corrode the stainless-steel equipment used for the washing and downstream processing of the activated carbon. In contrast, HCl is known to corrode stainless-steel equipment. Despite potentially better performance of HCl for removing impurities such as metals, it may be more advantageous overall to use citric acid in the wash stages.

The washing cycles are repeated until the pH of the used water after a water wash step has reached a value of 7±1.

In step 48, the washed activated carbon is dried. The activated carbon is optionally sized in step 50, for example by passing it through one or more sieves. Particles that are too large may be rejected. Particles that are either too large or too small may be rejected in order to obtain an optimum size range and/or an optimum spread in particle size. It may be that different size ranges are more useful than others depending on the particular use of the activated carbon. The particles that are too large may be reground in step 51 and then sized again. In step 51, the dried, activated carbon is optionally ground into finer particles using a milling method such as ball mill, air classifier unit, etc.

In step 52, the resulting activated carbon is then used, for example, in the production of a dry electrode for an energy storage device. The activated carbon may of course be used in other applications.

Optionally, in step 54, the waste liquid from the washing step 37 is salvaged for the recovery of KOH and/or other by-products, which may be purified and or directly reused in the process. Water from the waste liquid is evaporated in step 56. The process may utilize a Nutsche filter, for example to recover the KOH in step 58, and for the washing processes. The waste liquid may be heated in order to increase the percentage of KOH recovered. After recovery, the KOH may be used for activating another batch of material in step 59.

3. Exemplary Apparatus

Figure 3:
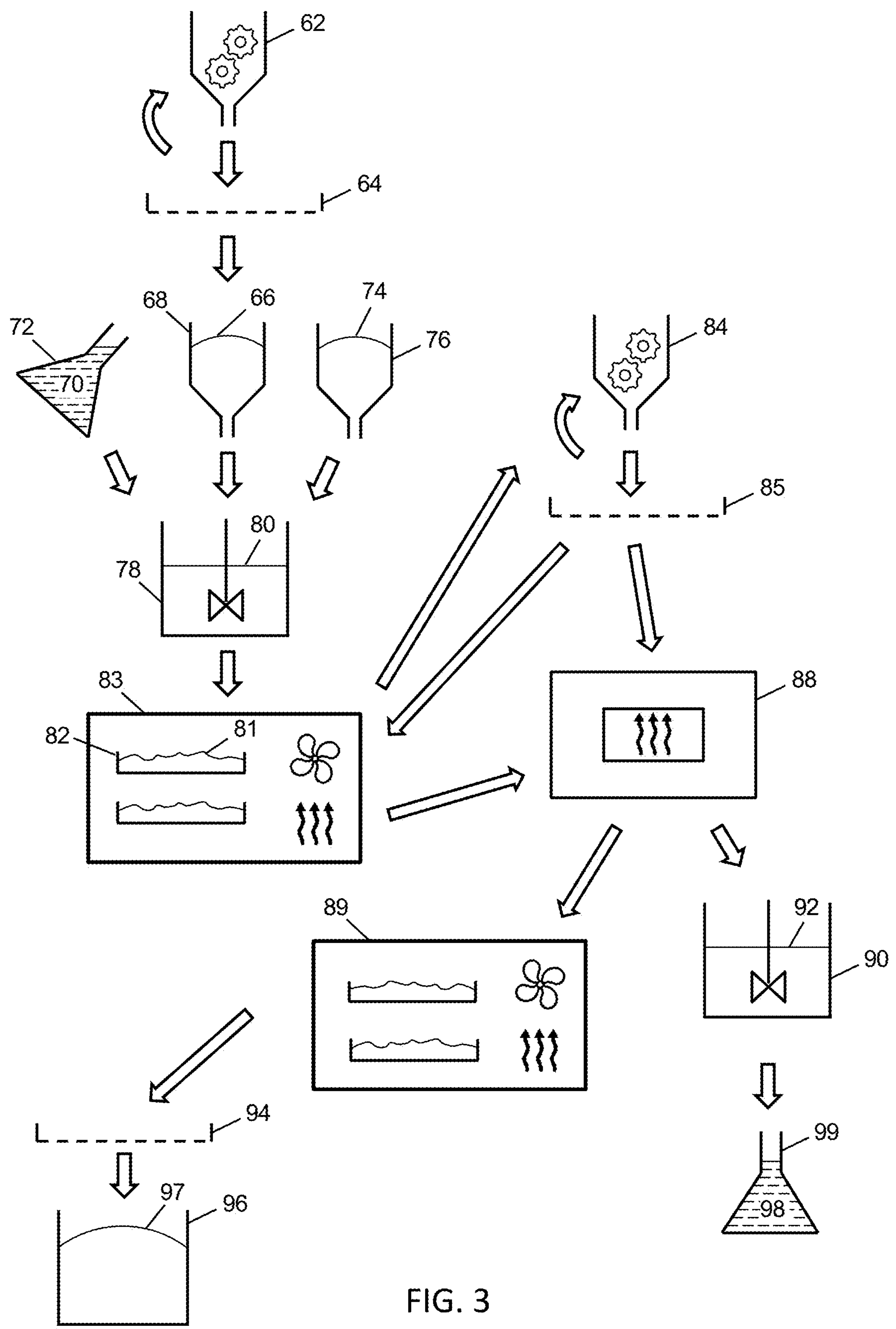
FIG. 3 is a schematic representation of apparatus for activating carbon, according to an embodiment of the present invention.

Referring to FIG. 3, exemplary apparatus for the process is shown. The raw materials, i.e. coal and/or coke are crushed and ground in a grinder 62. They are then passed through a sieve/sieves 64 in order to select the desired size range. Raw material that has not been ground enough may be fed back into the grinder.

The ground, raw material 66 may be collected in a hopper 68, for example. Water 70 from container 72, KOH 74 from hopper 76 and the ground raw material 66 from hopper 68 are then transferred into mixer 78. The mixture 80 is blended in the mixer.

After blending, the mixture is spread out into layers 81 on trays 82 in a dehydrator 83. After the mixture has been dried and optionally reblended several times to remix the KOH crust that forms, it is optionally reground in grinder 84 and optionally sized in sieve 85. Alternately, the dried mixture may be stirred and sieved to break up any clumps. When the desired size cut has been obtained, it is moved back into the dehydrator 83 for further drying. After drying the mixture, it is placed in a furnace 88, ideally a rotating tube furnace, in an inert atmosphere for activation.

After activation, the activated mixture is washed in a container 90, for example, with a wash liquid 92, which may be citric acid and water in alternation.

After washing, the activated mixture is dried, for example in dehydrator 89, or dehydrator 83, avoiding cross-contamination. After the activated mixture is dried, it may be ground, sieved again in sieve 94 and collected in container 96. The resulting activated carbon 97 is then ready for use.

The waste liquid 98 from the first washing of the activated mixture with water may be collected in a container 99 and treated to salvage the KOH for reuse in the activation of new raw materials.

In one embodiment of the invention the present disclosure describes a process for producing activated carbon for supercapacitors, the process comprising: (a) providing a carbon source as feedstock; (b) producing activated carbon with a predetermined pore size distribution from said feedstock; (c) controlling the varying factors that affect and result for specific surface area and pore size distribution for a formed activated carbon, which may include type of carbon source material, drying process, pre-carbonization, activating chemical mixing and soak time, chemical activating agent concentration and quantity, pyrolysis and activation reaction temperature, pyrolysis and activation reactor atmosphere, rate of temperature ramp up and ramp down, particle sizes, heteroatom doping; (d) in one or more zones that are indirectly or directly heated, processing said feedstock with a chemical and/or steam, within said zones using a substantially inert gas and an activating agent comprising at least one of KOH, water or carbon dioxide, to facilitate the hybrid activation of carbon, which includes gas inlet(s) and/or outlet(s) mechanically connected to said zone and/or zones; (e) optionally removing at least a portion of said vapors and/or steam from said zone and/or zones, which may be separate streams of vapors and/or steam; (f) optionally recycling at least a portion of said vapor and/or steam, or thermally treated form thereof, to said processing step(s) and/or feedstock throughout said process, and/or to facilitate conversion to syngas (town gas); (g) recovering at least a portion of said activated carbon and/or KOH; (h) grinding said activated carbon to a specific particle size, which may occur prior to activation and/or after activation of the carbon source material.

Figure 4:
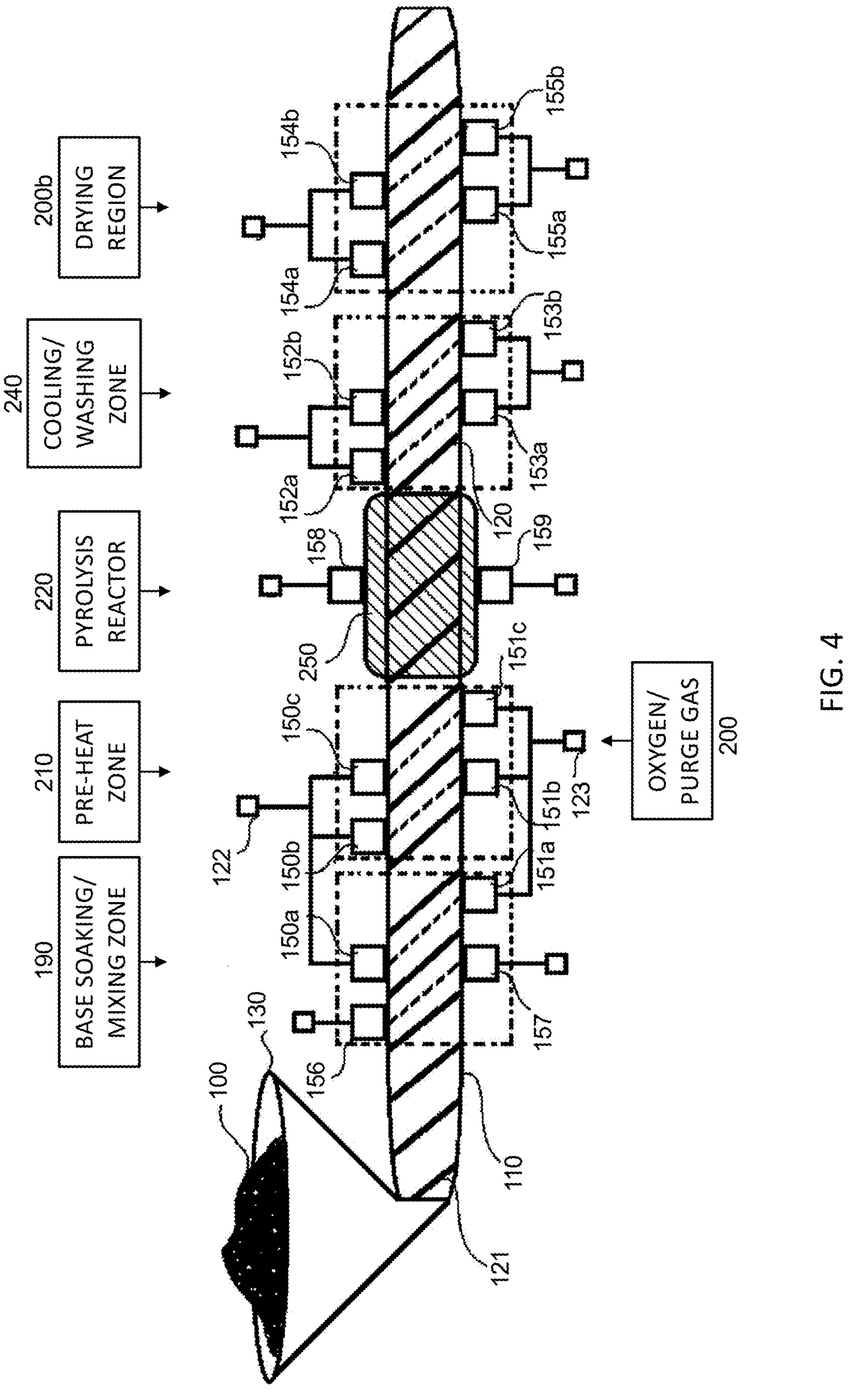
FIG. 4 is a diagram showing an exemplified embodiment of the invention including a continuous carbon material feed system with a single reactor multi-zone activated carbon production system.

FIG. 4 is a diagram depicting an exemplified embodiment of the invention including: a continuous carbon source 100 material feed system 110, with a single reactor 220 multi-zone design in order to produce pre-determined pore configuration carbonized activated carbon material.

Some exemplary features of the system may include: a step to determine the desired pore sizing and hierarchical structure for the final activated carbon to control the device to produce a desired resultant product; a grinding or pulverising section to pulverise the carbon source 100 into a fine powder; a material feed unit or hopper 130 to accept said carbon source, and a material feed system 110 for the said carbon source 100 which may include an auger 121 or alternate feed mechanism or means; a soaking/mixing section/zone 190 for said carbon source 100 which may include inlet(s) 156 and outlet(s) 157, and additionally include gas phase inlet(s) 150*a*, and outlet(s) 151*a*, and may include a soaking vessel or comparably similar component(s); an optional inert atmosphere; a thermally controlled drying and/or preheating zone 210 which may include gas phase inlets 150*b*, 150*c*, and outlets 151*b*, 151*c*; a reactor 220 and gas-phase separator 250 section/zone for pyrolyzing the carbon source 100 which may include an inlet(s) 158 and an outlet(s) 159; a cooling and/or washing zone/section 240 which may include liquid and/or gas phase cooling and inlets 152*a*, 152*b*, and liquid or gas phase heat recovery system outlets 153*a*, 153*b*, which in some embodiments are for the washing of the pyrolyzed carbon and additionally to introduce an additive; a drying region 200*b* that can be used to dry a pre-determined pore configuration pyrolyzed activated carbon. Additionally the device may also include an activated carbon material feed system 120 that may be used to transport the activated carbon and/or electrode mix throughout the device and into an electrode mixing storage hopper, for example.

In exemplified embodiments, the closed material feed system 110 includes a material feed hopper 130, a material transport mechanical system 110 and an oxygen purge manifold 200 or mechanical system with ports 150*a*, 150*b*, 150*c*, 151*a*, 151*b*, 151*c* which may be used as both inlet and outlet ports.

In exemplified embodiments, the material feed hopper 130 may be any suitable open-air or closed-air container configured to receive carbon source material 100. The material feed hopper 130 may be mechanically and operably connected with the material feed system 110, which may be, in certain embodiments, a screw or auger 121 system operably rotated by a drive source, such as a motor or other mechanically operable device. In an additional embodiment, the carbon source material 100 may be fed into the material feed system 110 by a gravity-feed system. In certain embodiments the material feed system 110 may be constructed such that the screw or auger 121 is enclosed in a suitable enclosure. In additional embodiments, the described enclosure may be substantially cylindrical in shape. In additional embodiments, the material feed system 110 may include a screw, auger, conveyor, drum, screen, chute, drop chamber, pneumatic conveyance device, and may also include a rotary airlock and/or a double or triple flap airlock.

In certain embodiments the carbon source material 100 is fed from the carbon source material feed hopper 130 to the material feed system 110, the auger and/or screw is rotated, this rotation causes the moving of the raw carbon source material 100 toward the oxygen purge manifold. It should be expressed that, when the carbon source material 100 reaches the oxygen purge manifold, the ambient air among the raw carbon source material 100 in the material feed system 110 may include roughly about 21% oxygen. In additional embodiments, the oxygen purge manifold may be arranged in such a manner to be adjacent to or around the material feed system 110. In certain embodiments the oxygen purge manifold, and/or the enclosure of the material feed unit 110 may include a plurality of gas ports 151*a*, 151*b*, 151*c* used for inlet, and a plurality of gas ports 150*a*, 150*b*, 150*c* used for outlet.

In certain embodiments the oxygen purge manifold may have at least one gas inlet line 123 and at least one gas outlet line 122. In additional embodiments, the at least one gas inlet line 123 of the oxygen purge manifold may be in operable communication and mechanically connected with each of the plurality of gas inlet ports 151*a*, 151*b*, 151*c*. In additional embodiments, the at least one gas outlet line 122 of the oxygen purge manifold may be in operable communication and mechanically connected with each of the plurality of gas ports 150*a*, 150*b*, 150*c*. In certain embodiments, the gas inlet line(s) may be configured to pump an inert gas into the gas ports 151*a*, 151*b*, 151*c*. In certain embodiments, the inert gas is nitrogen and/or argon and/or helium containing substantially no oxygen. In an additional embodiment, the inert gas is introduced counter-current to the carbon source material.

In certain embodiments, the introduction of an inert gas into the enclosed feed system 110 may be used to force the ambient air out of the enclosed system. In certain embodiments when in operation, and when the inert gas is introduced to the first gas inlet port 151*a*, a quantity of oxygen-rich ambient air is forced out of an outlet port 150*a*. It should be understood that, at this point, the desired level of less than or equal to about 2% oxygen, less than or equal to about 1% oxygen, less than or equal to about 0.5% oxygen or less than or equal to about 0.2% or less than or equal to about 0.1% oxygen may not be achieved. In additional embodiments, additional infusions of the inert gas must be made in order to purge the requisite and/or desired amount of oxygen from the air surrounding the carbon source material 100 in the enclosed system. In additional embodiments, the second gas inlet port 151*b* may pump the inert gas into the enclosed system in concert with the infusion at the first gas inlet port 151*a*, thereby allowing for the purging of partially or substantially more of the remaining oxygen from the enclosed system. It should be understood that after one or two or a plurality of infusions of inert gas to purge the oxygen, the desired result of lowering oxygen content percentage may be achieved. In additional embodiments, if the desired oxygen levels are still not achieved after two inert gas infusions, a third infusion 151*c* of inert gas at gas may be used, and may purge remaining undesired amounts of oxygen from the enclosed system at a gas outlet 150*c*. Additional inlet and outlet pluralities may also be incorporated if desired. In additional embodiments, oxygen levels may be monitored throughout the material feed system 110 to allow calibration of the amount and location of inert gas infusions to ensure desired performance, safety and resulting processed pre-determined pore configuration carbonized activated carbon material.

In certain embodiments it should be noted that the gas inlet port(s) 151*a*, 151*b*, 151*c* and the corresponding gas outlet port(s) 150*a* 150*b*, 150*c* respectively, are slightly offset from each other with respect to a vertical bisecting plane through the material feed unit 110. In certain embodiments, inlet port(s) 151*a*, 151*b*, 151*c* and corresponding outlet port(s) 150*a*, 150*b*, 150*c*, may be offset on the material feed system 110 by an amount that approximately corresponds with the pitch of the auger 121 in the material feed unit 110. In additional embodiments, after the atmosphere surrounding the raw material 100 is de-oxygenated to a predetermined or satisfactory level, it may then be fed from the material feed system 110 into a reaction zone 220 or zones. In additional embodiments, oxygen levels may be monitored throughout the material feed system 110 to allow the calibration of the amount and location of inert gas infusions to allow pre-determined or desired levels.

In additional embodiments, the device includes a plurality of gas introduction probes(s) and gas extraction probes(s) located at various points throughout the device.

In certain embodiments, the device may include a single reactor 220 having two to a greater plurality of different zones. Described in certain embodiments, multiple zones are shown, however, any different number of zones could be employed in alternate embodiments. In an additional embodiment, each zone may be connected to at least one other zone via a material transport unit 110. In an additional embodiment, the material transport 110 unit may control atmosphere and temperature conditions.

In exemplified embodiments, the carbon source material 100, such as coal or petroleum coke, is optionally dried, ground, pulverised, and sized, for instance by passing through a mesh, outside the reactor 220 and then introduced into a soaking/mixing zone 190 with an optional low-oxygen containing atmosphere, which may occur prior to being introduced into the carbon source hopper 130. This may be accomplished optionally with the use of the material feed system 110. The material feed system 110 may be controlled to reduce the oxygen level for the ambient air of the device to less than or equal to about 3%, 2%, 1% or 0.1%. Once the oxygen levels have been decreased in the device the raw carbon material 100 enters the soak/mixing zone 190 via the enclosed material feed system 110. In one such embodiment, the raw material feed system 110 may comprise an encapsulated jacket or sleeve by which steam and off-gases from the reactor 220 are used to heat the carbon source material 100, directly, or used by a process gas heater and/or heat exchanger which is then used to preheat or pyrolyze the carbon source material 100.

Subsequently and in exemplified embodiments, an additive with water, such as a non-limiting example of KOH, is distributed thoroughly and/or evenly throughout the carbon source material 100 for a period of time prior to heating and/or pyrolysis, a soak time, within the soaking/mixing zone 190 for a period of about 10 min, about 20 min, about 30 min, about 40 min, about 50 min, about 1 hour, about 1.5 hours, about 2 hours, about 3 hours, about 4 hours, about 5 hours, about 6 hours, about 7 hours, about 8 hours, about 9 hours, about 10 hours, about 11 hours, about 12 hours, about 13 hours, about 14 hours, about 15 hours, about 16 hours, about 17 hours, about 18 hours, about 19 hours, about 20 hours, about 21 hours, about 22 hours, about 23 hours, about 24 hours, about 25 hours, about 26 hours, about 27 hours, about 28 hours, about 29 hours, about 30 hours, about 31 hours, about 32 hours, about 33 hours, about 34 hours, about 35 hours, about 36 hours, about 37 hours, about 38 hours, about 39 hours, about 40 hours, about 41 hours, about 42 hours, about 43 hours, about 44 hours, about 45 hours, about 46 hours, about 47 hours, about 48 hours, about 49 hours, about 50 hours, or around 2-24 hours for practicality.

Subsequently and in exemplified embodiments, the pre-soaked carbon source 100 enters the preheating/drying zone 210, wherein the carbon source 100 and internal temperature are raised from around ambient temperature to around 100° C., to a temperature of about 150° C. or to about 200° C. In an additional embodiment, the temperature remains below 200° C. In additional embodiments the preheating/drying zone 210 may include a mechanism to capture and/or exhaust off-gases from the pre-soaked carbon source 100 while it is being heated. In additional embodiments, the off-gases are extracted for optional use at a later time. In additional embodiments, the heating source used for the various mechanical systems is electrical or gas. In additional embodiments, the heating source used for the various zones is waste gas from other reactors of the device and/or may be from external sources. In additional embodiments, the heat may be from an indirect source.

Subsequently after preheating in a heating/drying zone 210, a material feed system 110 transfers the preheated carbon source 100 into a separate zone/reactor 220 which is optional. In an additional embodiment the first zone 210 and reactor 220 is the same reactor. In an additional embodiment where the first zone 210 is different than the reactor 220, a material feed system 110 may penetrate the reactor 220 through as a non-limiting example a high-temperature vapor seal system such as an airlock, this may allow the carbon source 100 to penetrate the reactor 220 while preventing gas and/or heat from escaping or from oxygen from entering. In additional embodiments, the interior of the reactor 220 is heated to a temperature of about 100° C., or about 200° C., or about 300° C., or about 400° C., or about 500° C., or about 600° C., or about 700° C., or about 800° C., or about 900° C., or about 1000° C., or about 1100° C., with 800° C. being used for 2 hours for example. In an additional embodiment, the reactor 220 may comprise an output port 159 to capture and exhaust gases (or off-gases) given off, for instance from the preheated carbon source material 100 while it is undergoing pyrolysis. In an additional embodiment, off-gases are extracted and stored for optional later use. In an additional embodiment, the off-gases from the reactor 220 and the off-gases from a plurality of zones of the device may be combined into a single gas stream. Once carbonized, the carbon source material 100 is now pre-determined pore configuration pyrolyzed activated carbon with a pre-determined hierarchical pore structure and may exit the reactor 220 by means of an activated carbon feed system 120, which in certain embodiments is the same feed system as the carbon source feed system 110 and may enter an optional cooling/washing zone 240 for cooling and washing. At this stage washing the activated carbon with water and an optional additive is carried out. In certain embodiments washing and/or cooling may be accomplished in a certain or controlled amount of time, for instance a soak time, for a period of about 10 min, about 20 min, about 30 min, about 40 min, about 50 min, about 1 hour, about 1.5 hours, about 2 hours, about 3 hours, about 4 hours, about 5 hours, about 6 hours, about 7 hours, about 8 hours, about 9 hours, about 10 hours, about 11 hours, about 12 hours, about 13 hours, about 14 hours, about 15 hours, about 16 hours, about 17 hours, about 18 hours, about 19 hours, about 20 hours, about 21 hours, about 22 hours, about 23 hours, about 24 hours, about 25 hours, about 26 hours, about 27 hours, about 28 hours, about 29 hours, about 30 hours, about 31 hours, about 32 hours, about 33 hours, about 34 hours, about 35 hours, about 36 hours, about 37 hours, about 38 hours, about 39 hours, about 40 hours, about 41 hours, about 42 hours, about 43 hours, about 44 hours, about 45 hours, about 46 hours, about 47 hours, about 48 hours, about 49 hours, about 50 hours, or around 3-8 hours of soaking, which is more practical. Wherein in certain embodiments the cooling/washing zone 240 may be the same reactor 220, and/or a different reactor or zone.

In exemplary embodiments, when the pre-determined hierarchical pore configuration pyrolyzed activated carbon product enters the cooling/washing zone 240, the material is allowed to cool (actively or passively) to a specified temperature. In an additional embodiment, the temperature of the pre-determined pore configuration activated carbon is reduced in the cooling/washing zone 240 within a substantially inert atmosphere. In an additional embodiment, the cooling/washing zone 240 may cool the pre-determined pore configuration activated carbon material with water cooling, and may include an additive. It should be noted that the pre-determined pore configuration carbon material may be allowed to cool in the cooling/washing zone 240 wherein it reaches a point where it will not undergo spontaneous combustion if exposed to normal atmosphere and/or oxygenated air. In an additional embodiment, the cooling/washing zone 240 reduces the temperature of the carbon material below 200° C. or about 150° C. or about 100° C. In exemplified embodiments, the device may include an optional mixing system to mix the activated carbon material, coolant, and additive, which may allow for the uniform cooling of the carbon material. Additionally, cooling may occur by either direct or indirect means, which may be with water and/or other liquids or additives; additionally the cooling process may also occur by direct or indirect means with air or other gases, and/or a combination of the both of the above.

In certain embodiments, the cooling mechanisms are separate from the reactors 220, and may be mechanically coupled to the activated carbon material feed system 120. In additional embodiments, the cooling mechanism is located after the reactors 220. In additional embodiments, the cooling mechanism may be the same as, or built into, the reactors 220. In additional embodiments, the cooler mechanism is comprised of, for example, a screw, auger 121, conveyor which is specifically a belt conveyor, in certain embodiments, drum, screen, pan, counterflow bed, vertical tower, jacketed paddle, cooled screw, and/or a combination thereof, which cools by either direct or indirect means, and with water and/or other liquids/additives, and/or direct or indirectly with gases, and/or any combination of the above. In additional embodiments, the cooler(s) could include a water spraying mechanism or inlet port(s) 152*a*, 152*b* (with or without an additive), a cooled inert gas stream mechanism and/or outlet port(s) 153*a*, 153*b*, which may be liquid nitrogen, or ambient air if below ignition and/or a combustible temperature. In additional embodiments heat may be recovered from or during this step, an example would be by capturing the flash steam generated by a water spray, and/or the superheated steam generated when a saturated steam is introduced, which may be mixed into and throughout, and may then heated by the activated carbon material.

In exemplified embodiments, the raw carbon source material 100, such as coal, petroleum coke, oil, biomass is introduced into the reactor 220 in a low-oxygen containing atmosphere, which may be accomplished optionally through the use of a material feed system 110 that has been already described. The material feed system 110 may be used to reduce the oxygen level in the ambient air in the system to less than or equal to about 3%, 2%, 1%, 0.1% which may accommodate the process of pyrolysis free of combustion. Raw carbon source material 100 may enter the device in an enclosed material feed system 110, which may be after the oxygen levels have been decreased. In additional embodiments, the material feed system 110 may include an encapsulated jacket(s) or sleeve(s) through which steam and/or off-gases from the reactor are sent and/or used in the preheating of the carbon source material 100.

In additional embodiments, the raw carbon source material 100 may first travel from the material feed system 110 and through an optional drying and/or preheat zone 210 or area of the device. In an additional embodiment, the optional drying zone 210 may heat the raw material to remove water and other moisture or combustible gases/tars, which may be a separate zone and prior to it being passed along into the separate preheat zone 210. In an additional embodiment, the interior of the optional drying zone 210 may be heated to a temperature of about ambient temperature to about 100° C., to about 150° C. or to about 200° C. Water or moisture removed from the raw carbon source material 100 may be exhausted, in one example from ports 150*b*, 150*c*, from the optional drying zone 210 or area. In an additional embodiment, the optional drying zone 210 may be adapted to allow vapors, steam, and/or moisture, to be extracted. In an additional embodiment, vapors, steam, and/or moisture from the optional drying zone 210 may be extracted for optional later use. This moisture, vapor, or steam, which has been extracted from the optional drying zone 210 may be used in a suitable waste heat recovery system and may be in conjunction with the material feed system 110. In an additional embodiment, the vapor, steam, and/or moisture, used in the material feed system 110 may be used to preheat the raw carbon source materials 100 while oxygen levels are being purged in or by the material feed system 110. In an additional embodiment, the carbon source material 100 is dried outside of the reactor(s) 220 and the reactor(s) do not comprise a drying zone 220.

In an additional embodiment, the dried carbon source material 100 enters a preheat zone 210, wherein the temperature may be raised from the range of about ambient temperature to a temperature range of about 100° C., to about 150° C. or to about 200° C. In an additional embodiment, the temperature does not exceed 200° C. in the preheat zone 210. It should be appreciated that if the preheat zone is too hot, or subsequently not hot enough, than the dried carbon source material 100 may be processed in a non ideal manner prior to entering the reactor 220 zone. The preheat zone 210 may include an output mechanism 150*b*, 150*c*, to capture, for current or later reuse, exhaust off-gases from the dried carbon source material 100 while it is being preheated. In additional embodiments, the off-gases may be extracted for optional later use. In additional embodiments, the heating source used for the various zones may be electric or gas. In additional embodiments, the heating source used for the various zones may be waste gas from other zones of the device and/or from the external source(s). In additional embodiments, the heat may be indirect.

After processing within the preheat zone 210, the material feed system 110 may pass the preheated material into the reactor 220 to undergo the pyrolysis process. In an additional embodiment, the material feed system 110 may penetrate the pyrolysis zone 220, which may be through a high-temperature vapor seal system, which may include a non-limiting example of an airlock, which may allow the material feed system to penetrate the high-temperature pyrolysis reactor 220 zone while preventing or minimizing gas from escaping, and/or oxygen from entering. In an additional embodiment, the interior of the pyrolysis zone and/or reactor 220 is heated to a temperature of about 100° C., about 200° C., about 300° C., about 400° C., about 500° C., about 600° C., about 700° C., about 800° C., about 900° C., about 1000° C., about to 1100° C., or to about 800° C., at a rate of 10° C. per minute, for example. In an additional embodiment, the gases may be extracted for optional later use at the discretion of the operator. In an additional embodiment, the off-gases from the preheat zone(s) 210 and the off-gases from the pyrolysis zone(s) 220 may be combined into a single gas stream. Once carbonized, the carbonized carbon source material exits the pyrolysis reactor 220 zone and may then enter into a cooling/washing zone 240.

In additional embodiments, the raw carbon source material 100, and subsequently the dried carbon source, preheated carbon source, pre-determined pore configuration carbonized activated carbon material, travel through the reactor 220 and/or reactors, along a continuous material feed unit 110 and/or system. In additional embodiments, the material feed system 110 may carry the carbon source material 100 which may differ at different stages in the process. In additional embodiments, the process of moving the material through the reactor 220, zones or reactors is a continuous process. In certain embodiments, the speed of the material feed system 110 may be appropriately calibrated, calculated, and controlled by an associated controller and/or processor such that the operation of the material feed system 110 does not require interruption as the material moves through the device and reactor 220 or reactors zone and/or zones. In certain embodiments, the material feed unit 110 may be operationally sectioned, and may include a plurality of separate augers or additional carbon material feed mechanisms as described in this disclosure, each controlled by an associated controller and/or processor such that the operation of individual carbon material feed mechanisms allows the material feed system 110 to control the rate of progression between zones, stages, or reactors for the carbon material 100 depending on the optimal time for the carbon source material 100 to remain within a specific zone, stage, reactor, of the device.

In additional embodiments, a controller associated with the reactor 220 or reactors may be configured to adjust the speed of the material feed unit 110, which may be based on one or more feedback sensors, detected gas which may be from the optional FTIR (Fourier transform infrared spectroscopy), measured parameters, temperature gauges, and/or other suitable variables in the reactor 220 or reaction process. It should be noted in additional embodiments, suitable moisture sensors, temperature sensors, or gas sensors in operable communication with the controller and/or processor may be integrated, or mechanically connected, into or between each of the zones and/or reactors 220 or at any suitable position along the material feed unit 110 or device. In additional embodiments, the controller and the processor may use the information obtained from the sensors and/or gauges by which to optimize the speed and efficiency of the device and/or processing systems. In additional embodiments, the controller which may be associated with the reactor 220 and/or reactors is configured to operate the material feed unit 110.

In additional embodiments, the controller associated with the reactor 220 or reactors may be configured to monitor the concentration, temperature, and moisture of the gas inside the material feed unit 110 or inside any of the reactors 220 and/or zones. In additional embodiments, the controller may be configured to adjust the speed of the material feed unit 110, the input of gases into the material feed unit, and/or the heat applied to the material 100 in the material feed unit, which may be based upon one or more readings taken by the various sensors.

It should also be noted that, in additional embodiments, the device is enclosed in a kiln shell to control and manipulate the high amounts of heat required for the reactor process and reactions to occur. In additional embodiments, the kiln shell of the device may include several insulating chambers which may surround a plurality of zones. In certain embodiments, the kiln includes a plurality separate zones for the device. In additional embodiments, each of the zones of the device includes at least one inlet and at least one outlet. In additional embodiments, within each zone the inlet and outlets are configured to be adjustable in which to control the flow of carbon feed material 100, gas and heat, into and out of the zone or zones. A supply of inert gas may be introduced into the inlets 151*a*, 151*b*, 151*c*, and the purged air may be extracted from the corresponding outlets 150*a*, 150*b*, 150*c*. In additional embodiments, one or more of the outlets of a zone in the device are connected to one or more of the other inlets or outlets in the device.

In additional embodiments, after the raw carbon source material 100 is de-oxygenated in the material feed system 110, it may be introduced to the device, and specifically to the first zones and/or the optional drying zone 210. In additional embodiments, the drying zone 210 may be heated to a temperature of about 80° C. to about 200° C. to reduce water and/or other moisture from the carbon source material 100. The carbon source material 100 may then be moved to the preheat zone, which may be the same zone, where the material 100 may be preheated.

In additional embodiments, the carbon source material 100 that has optionally been dried and/or preheated may then be moved into the carbonization reactor 220. In certain embodiments, carbonization may occur at a temperature from about 200° C. to about 1100° C., for example about 200° C., about 210° C., about 220° C., about 230° C., about 240° C., about 250° C., about 260° C., about 270° C., about 280° C., about 290° C., about 300° C., about 310° C., about 320° C., about 330° C., about 340° C., about 350° C., about 360° C., about 370° C., about 380° C., about 390° C., about 400° C., 410° C., about 420° C., about 430° C., about 440° C., about 450° C., about 460° C., about 470° C., about 480° C., about 490° C., about 500° C., about 510° C., about 520° C., about 530° C., about 540° C., about 550° C., about 560° C., about 570° C., about 580° C., about 590° C., about 600° C., about 610° C., about 620° C., about 630° C., about 640° C., about 650° C., about 660° C., about 670° C., about 680° C., about 690° C., about 700° C., about 710° C., about 720° C., about 730° C., about 740° C., about 750° C., about 760° C., about 770° C., about 780° C., about 790° C., about 800° C., about 810° C., about 820° C., about 830° C., about 840° C., about 850° C., about 860° C., about 870° C., about 880° C., about 890° C., about 900° C., about 910° C., about 920° C., about 930° C., about 940° C., about 950° C., about 960° C., about 970° C., about 980° C., about 990° C., about 1000° C., about 1010° C., about 1020° C., about 1030° C., about 1040° C., about 1050° C., about 1060° C., about 1070° C., about 1080° C., about 1090° C., about 1100° C., or about 800° C. which is typically used.

In additional embodiments, a carbonization zone of a reactor 220 is constructed to allow gases produced during carbonization to be extracted and/or stored for a desired later use. In additional embodiments, gases produced during carbonization are extracted for optional current or later use. In additional embodiments, a carbonization temperature is selected and maintained to reduce and/or eliminate the production of methane and maximize carbon content of the carbonized carbon source material 100.

In additional embodiments the reactor 220 may include at least one input port 158 and a plurality of outlet ports 159. In additional embodiments, one of the outlet ports 159 may be connected to collection equipment or to further processing equipment, such as an acid hydrogenation unit or distillation column. In additional embodiments, the reactor 220 may processes the off-gases that may come from the preheat zone 210 and the pyrolysis reactor zone, which may produce a condensate and/or an enrichment gas. In an additional embodiment, the condensate may include polar compounds, such as non-limiting examples of acetic acid, methanol and furfural. In an additional embodiment, the enrichment gas produced by means of the reactor 220 may include at least non-polar gases. In an additional embodiment, the gas reactor 220 may comprise a fractionation column. In an additional embodiment, acetic acid may be sent via a line or channel to an optional acid hydrogenation unit. In an additional embodiment, methanol and/or furfural may be sent via optional additional line(s) and/or channels to a distillation/processing unit.

In additional embodiments, the carbon recovery unit may also include an input connected to the reactor 220. In additional embodiments, gases pulled from the carbon recovery unit are optionally used in energy recovery systems and/or systems which may further offer carbon enrichment. Additionally, in various embodiments, gases may be pulled from one or more zones of the device and optionally used in energy recovery systems and/or systems for further carbon processing.

As discussed, high oxygen levels in the ambient air surrounding raw materials 100 as they are processed could result in undesirable combustion or oxidation of the raw material 100 to occur, this can drastically reduce the amount and quality of the final activated carbon material. In additional embodiments, the material feed system 110 may be a closed system that includes one or more manifolds configured to purge oxygen from the air surrounding the raw carbon source material 100 and/or within the zone(s) or reactor(s) 220. In additional embodiments, an oxygen level of about 0.5% to about 1.0% may be used for preheating, pyrolyzing and/or carbonizing and/or cooling. It should be noted that a goal of the closed material feed system 110 is designed to reduce oxygen levels to less than or equal to about 3%, less than or equal to about 2%, less than or equal to about 1% or less than or equal to about 0.5% throughout the process. Once the oxygen levels are reduced, the carbon source material 100 is transferred along the material feed system 110 in the device. In additional embodiments, the preheating of inert gases throughout the recovery process, and with the subsequent introduction of preheated inert gases to the device, reactor, or trimming reactor, makes the system more efficient and may reduce energy consumption.

In additional embodiments, a trimming reactor may be included in the system. In an additional embodiment with a trimming reactor, pyrolyzed material from the device is fed into the separate additional reactor(s) for further pyrolysis where heated inert gas may be introduced to create a product with higher fixed carbon level. In additional embodiments, this secondary process may be conducted in a container such as non-limiting examples of, a drum, tank, barrel, bin, tote, pipe, sack, press, or roll-off container. In additional embodiments, a final container may be used for transport of the carbonized material. In additional embodiments, inert gas may be heated via a heat exchanger which may derive heat from gases extracted from the device, which may be combusted in a process gas heater.

In an additional embodiment, heat, steam and gases recovered from the reactor 220 may be directed to the material feed system 110 where they may be enclosed in jacket and separated from direct contact with the carbon source material 100, but may be used to indirectly heat the carbon source material 100 prior to introduction to the reactor 220 and/or reactors and/or drying zones.

In alternate embodiments, heat, steam and gases recovered from the drying zone(s) 210, 200*b*, or the reactor(s) 220 may be directed to the material feed system 110 where they may be enclosed in a jacket and/or separated from direct contact with the carbon source material 100, this also allowing the indirect heating of the feed material 100 prior to the introduction of the feed material 100 to the reactor(s) 220.

In additional embodiments, the pre-determined pore configuration carbonized activated carbon material may be moved to a temperature-reducing or cooling zone 240 and may be passively or actively cooled. In additional embodiments, pre-determined pore configuration carbonized activated carbon material may be cooled to a temperature of about 10° C., about 20° C., about 30° C. or about 40° C. In additional embodiments, the pre-determined pore configuration carbonized activated carbon material may be moved to a temperature reducing or cooling zone/washing zone 240, which may be cooled and washed to remove an additive, such as a base, such as specifically KOH, simultaneously. In additional embodiments, the pre-determined pore configuration carbonized activated carbon material may be moved to a temperature-reducing or cooling zone 240, which may be cooled and washed simultaneously with water.

In exemplified embodiments, when the pre-determined pore configuration carbonized activated carbon material enters the cooling/washing zone 240, the carbonized material is allowed to cool to a predetermined temperature range of about 20° C. to 30° C. which is generally about room temperature. In additional embodiments, the device includes a plurality of cooling/washing zones 240. In additional embodiments, the cooling/washing zone(s) 240 may cool the carbonized material to below 200° C. In an additional embodiment, the cooling/washing zone(s) 240 may include a mixer and/or auger to agitate and uniformly cool and/or wash the carbonized materials. In additional embodiments, one or more of a plurality of cooling/washing zones 240 may be outside of the device.

In additional embodiments, the pre-determined pore configuration carbonized activated carbon material exits the cooling/washing zone 240 along the activated carbon feed system 120 and then may enter the carbon recovery unit.

The pre-determined pore configuration carbonized activated carbon material may at this point be in a powder state or may be pulverised to create a fine powder. In certain embodiments the grinding and/or pulverising may occur prior to activation, and/or after carbon activation.

In additional embodiments, the device includes a plurality of gas introduction probes(s), e.g. 155*a*, 155*b*, and gas extraction probes(s), e.g. 154*a*, 154*b*, located at various points throughout the device. In additional embodiments, one of each gas introduction probe(s) and one of each gas extraction probe(s) correspond with a different one of the plurality of zones. In alternative embodiments, the device includes any suitable number of gas introduction probe(s) and gas extraction probes(s) including in certain embodiments having one gas introduction probe(s) and more than one gas extraction probe(s) for each of the plurality of zones.

Figure 5:
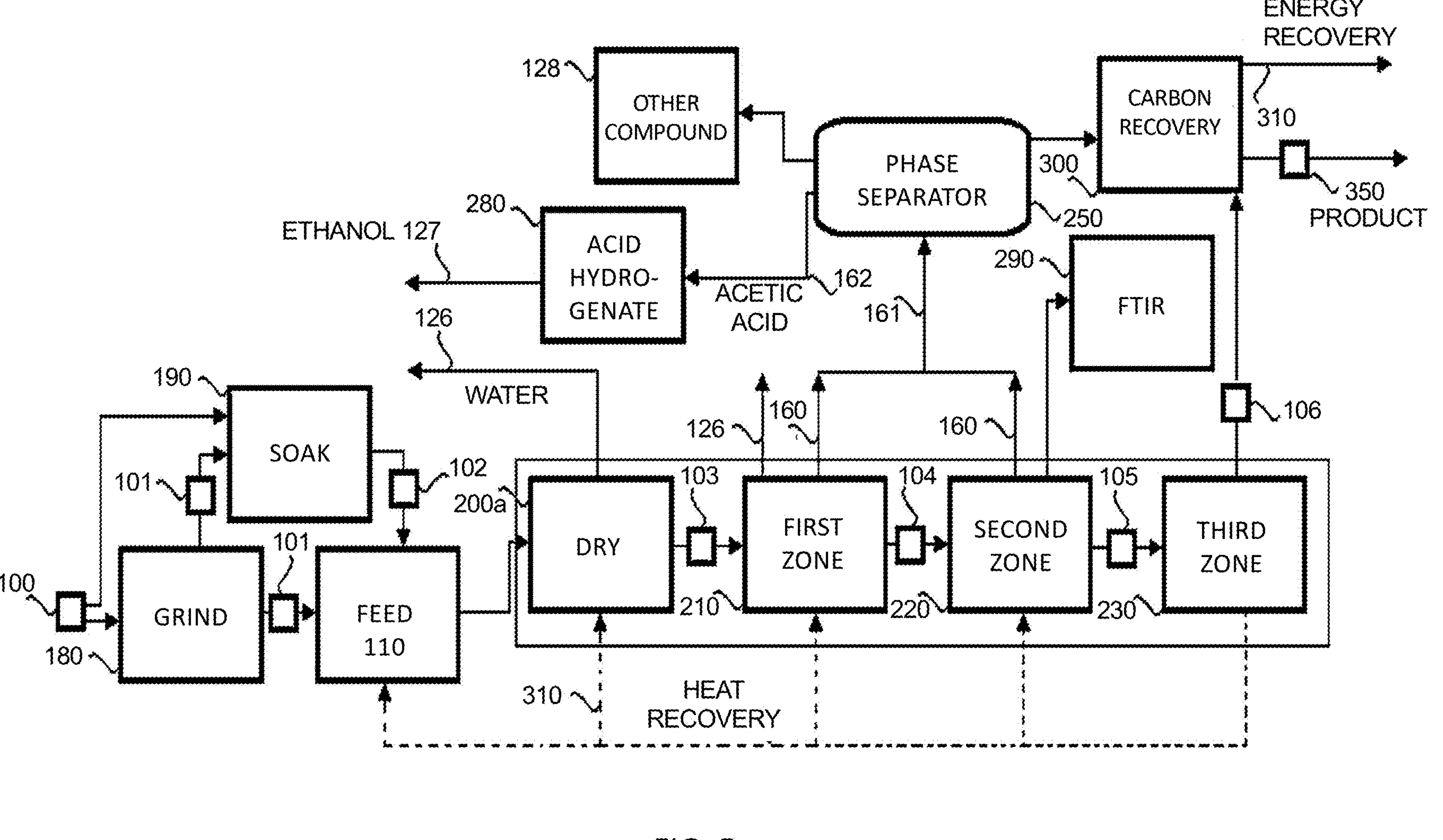
FIG. 5 is a block diagram of an exemplified embodiment of the invention including a continuous carbon material feed system with a single reactor multi zone activated carbon production system.

FIG. 5 is a functional block diagram of an exemplified embodiment of the invention including a continuous carbon material feed system 110, with a single reactor multi-zone, pre-determined pore configuration hierarchical structure activated carbon production system.

In an exemplified embodiment the improved pre-determined pore configuration hierarchical structure activated carbon, and finished energy storage device comprises: a step to determine the desired pore sizing and hierarchical structure for the final activated carbon, to control the device's parameters to produce a desired resultant product; an optional carbon source drying step 200*a*; a step to feed the carbon source material 100 into an optional sizing and pulverizing system 180; a step to pulverize carbon material 100 and produce pulverised carbon material 101; a step to feed carbon source material 100 into a chemical base soaking tank/system 190; alternatively, a step to feed pulverised carbon material 101 into a chemical base soaking tank/system 190; alternatively, a step of feeding the pulverized carbon material 101 into to an optional chemical base soaking tank/system 190; a step of soaking the carbon source material 100 or pulverised carbon material 101 in a base chemical and water solution to produce base soaked carbon material 102; a step of feeding, by means of the material feed system 110, the carbon source material 100; or alternately the pulverised carbon material 101 into an optional drying system/zone 210 (preheat zone); alternatively, a step of feeding base soaked carbon material 102, by means of the carbon source material feed system 110, to the optional drying system/zone 210; a step of drying the base soaked carbon material 102, or alternatively the carbon source material 100, in the optional drying system/zone 200*a*; a step of removing water 126, and/or chemical such as a base, from the base chemical soaked carbon source material 102; a step of producing dried carbon material 103; a step of recovering and/or recycling heat, by means of a heat recovery system 310; a step of feeding dried carbon material 103 by means of a carbon feed system 110 into an optional first zone/preheat reactor 210; a step of preheating the dried carbon material 103 in the first zone/preheat reactor 210 to produce preheated carbon material 104; a step of exhausting water 126, and/or gases via a line 160; a step of feeding the preheated carbon material 104 by means of a carbon feed system 110 to a second zone/reactor 220 to undergo pyrolysis; a step of the preheated material 104 undergoing pyrolysis, or alternatively dried material 103 undergoing pyrolysis, in the second zone/pyrolysis reactor 220 to produce pre-determined pore configuration hierarchical structure activated carbon material 105; an optional step of monitoring the second zone/pyrolysis reactor 220 by means of an optional FTIR 290; a step of feeding activated carbon material 105 by means of an activated carbon feed system to an optional third zone (or a cooling/washing reactor) 230 for cooling, and/or washing; a step of exhausting gases through a line 160 from the first preheat zone 210; a step of exhausting gases through a line 160 from the second zone/pyrolysis reactor 220; a step of exhausting gases through a second line 160, which may be combined into a single line 161; a step of exhausting gases through a combined line 161 into the phase separator 250; a step of capturing, from exhausting gases, polar compounds 128, which optionally may be used immediately for heat, or energy recovery, and/or stored for later use; a step of transferring acetic acid through a line 162 from the gas phase separator 250 to an acid hydrogenation unit 280; an optional step of turning acetic acids into ethanol 127; an optional step of feeding cooled/washed activated carbon material 106 via the activated carbon feed system into an active carbon recovery unit 300; an optional step of removing finished activated carbon product 350 from the activated carbon recovery unit 300, produced in the pre-determined pore configuration hierarchical structure activated carbon material production device; an optional step of recovering energy 310, by means of the activated carbon recovery unit 300; a step of cooling/washing activated carbon material 106, produced in the pre-determined pore configuration hierarchical structure activated carbon material production device.

4. KOH, Water and Soaking

In one embodiment, the method includes a process which includes one or more of the following: selecting an appropriate carbon source material; contacting and/or soaking a carbon source with KOH or an aqueous solution of KOH for about less than 1 hour, about 1 hour, about 2 hours, about 3 hours, about 4 hours, about 5 hours, about 6 hours, about 7 hours, about 8 hours, about 9 hours, about 10 hours, about 11 hours, about 12 hours, about 13 hours, about 14 hours, about 15 hours, about 16 hours, about 17 hours, about 18 hours, about 19 hours, about 20 hours, about 21 hours, about 22 hours, about 23 hours, about 24 hours, about 25 hours, about 26 hours, about 27 hours, about 28 hours, about 29 hours, about 30 hours, about 31 hours, about 32 hours, about 33 hours, about 34 hours, about 35 hours, about 36 hours, about 37 hours, about 38 hours, about 39 hours, about 40 hours, about 41 hours, about 42 hours, about 43 hours, about 44 hours, about 45 hours, about 46 hours, about 47 hours, about 48 hours, about 49 hours, about 50 hours, wherein 2-24 hours is a practical example; using a mass ratio of KOH to carbon source of about 1:1, about 2:1, about 3:1, about 4:1, about 5:1, about 6:1, about 7:1, about 8:1, about 9:1, about 10:1, with a mass ratio of 2-4 parts KOH to 1 part carbon source being a practical example; additionally adding water to the mixture to dissolve the KOH and better saturate the carbon source, and wherein water may be used to dilute the base KOH using up to 20 litres water to 1 kg KOH, with 0.5 litre water to 1 kg KOH being a practical example.

5. Drying

In exemplified embodiments, the pre-soaked carbon source mixture enters the preheating/drying zone, wherein the carbon source and internal temperature is raised from around ambient temperature to around 60° C.-100° C., or up to about 150° C., or up to about 250° C. In an additional embodiment, the drying temperature may remain below 50° C. In some embodiments air is moved over or through the soaked carbon mixture to provide dehydration to the material.

In some embodiments an air circulating dehydration system, which may include heating, is used to dry the material at various stages of the process, for example, before pyrolysis or after washing. In certain embodiments a dehydration system may utilize a vacuum to dry the material. It should be understood that drying provides a material ready for activation. In certain embodiments, the mixture of KOH and carbon source is placed in metal trays; in certain embodiments, stainless-steel trays are used as stainless steel does not react with KOH; other trays such as silicone and aluminum may cause contamination of the mixture during dehydration. Additionally, in certain embodiments the layer of mixture is 2 cm thick or less to ensure effective drying, wherein the material could remain drying for 24 hours or longer, at 20° C. to 80° C. until dried. Additionally, cycles of grinding and drying may occur.

In some embodiments, water in the mixture of KOH and carbon source may be evaporated before the activation step in the same furnace under inert gas at a temperature less than 400° C.

In some embodiments, an optional pre-oxidation step is carried out for the carbon source material under air at a temperature between 200° C. to 400° C. for 1 to 3 hours.

In some embodiments, an optional carbonization step is carried out for the carbon source material under inert atmosphere, such as nitrogen or argon, at a temperature between 500° C. to 1300° C. for 1 to 3 hours.

In various alternate embodiments the carbon source, or mixture of carbon source and activating agent, is prepared by drying which may occur during one or more stages of the preparation and activation of the activated carbon, which may be over an extended period of time, for example over a period of time that is no less than 1 hour, no less than about 2 hours, no less than about 3 hours, no less than about 4 hours, no less than about 5 hours, no less than about 6 hours, no less than about 7 hours, no less than about 8 hours, no less than about 9 hours, no less than about 10 hours, no less than about 11 hours, no less than about 12 hours, no less than about 13 hours, no less than about 14 hours, no less than about 15 hours, no less than about 16 hours, no less than about 17 hours, no less than about 18 hours, no less than about 19 hours, no less than about 20 hours, no less than about 21 hours, no less than about 22 hours, no less than about 23 hours, or no less than about 24 hours. This may allow water and/or gases to exit the carbon source without destroying the structure of the feedstock and ensure oxidization is reduced during activation.

6. Activation

In additional embodiments, the mixture of activating agent (such as KOH) and carbon source material that has been optionally dried and/or preheated may then be moved into a furnace for carbonization or activation under an inert atmosphere. In certain embodiments, the carbonization of the mixture may be carried out under inert atmosphere at a temperature between 450° C. to 1300° C. for 0.5 to 4 hours. In some embodiments, the carbonization of the mixture may be carried out under inert atmosphere at a temperature between 700° C. to 1000° C.

In some embodiments, immediately before the activation/carbonization step, the mixture of activating agent and carbon source may undergo an optional heating step in the furnace under an inert atmosphere at a temperature between 300-430° C. for 1-3 hours. In some embodiments, immediately before the activation/carbonization step, the mixture of KOH and carbon source may undergo an optional heating step in the furnace under an inert atmosphere at a temperature between 380-420° C. for 1-3 hours.

In certain embodiments, carbonization may occur at a temperature from about 200° C. to about 1300° C., for example about 200° C., about 210° C., about 220° C., about 230° C., about 240° C., about 250° C., about 260° C., about 270° C., about 280° C., about 290° C., about 300° C., about 310° C., about 320° C., about 330° C., about 340° C., about 350° C., about 360° C., about 370° C., about 380° C., about 390° C., about 400° C., 410° C., about 420° C., about 430° C., about 440° C., about 450° C., about 460° C., about 470° C., about 480° C., about 490° C., about 500° C., about 510° C., about 520° C., about 530° C., about 540° C., about 550° C., about 560° C., about 570° C., about 580° C., about 590° C., about 600° C., about 610° C., about 620° C., about 630° C., about 640° C., about 650° C., about 660° C., about 670° C., about 680° C., about 690° C., about 700° C., about 710° C., about 720° C., about 730° C., about 740° C., about 750° C., about 760° C., about 770° C., about 780° C., about 790° C., about 800° C., about 810° C., about 820° C., about 830° C., about 840° C., about 850° C., about 860° C., about 870° C., about 880° C., about 890° C., about 900° C., about 910° C., about 920° C., about 930° C., about 940° C., about 950° C., about 960° C., about 970° C., about 980° C., about 990° C., about 1000° C., about 1010° C., about 1020° C., about 1030° C., about 1040° C., about 1050° C., about 1060° C., about 1070° C., about 1080° C., about 1090° C., about 1100° C., about 1120° C., about 1140° C., about 1160° C., about 1180° C., about 1200° C., about 1220° C., about 1240° C., about 1260° C., about 1280° C., about 1300° C., or more usually about 700-1000° C.

7. Activated Carbon Processes

In certain embodiments the activated carbon is made using activation methods such as physical activation, steam, $CO_2$, or mixture of them with or without $N_2$, or chemical activation methods with agents such as KOH, NaOH, $CaCO_3$, $K_2CO_3$, $Na_2CO_3$, $H_3PO_4$, $ZnCl_2$, $CuCl_2$, $KMnO_4$ etc. In certain embodiments carbonaceous or lignocellulose precursors include gasifying agents such as air, carbon dioxide, water vapor, and/or oxygen that may be used to physically and/or thermally to activate the material. Chemical activation may be done by one or more chemical agents including phosphoric acid, zinc chloride, potassium hydroxide, which may include the use of inert gases such as nitrogen argon, helium and/or noble gases.

In additional embodiments, after optionally pre-carbonizing the dried carbon source material a material feed system transfers the dried carbon source material into a separate zone/reactor which is optional to undergo activation. In an additional embodiment the first zone and reactor may be the same reactor. In an additional embodiment where the first zone is different than the reactor, a material feed system may penetrate the reactor through, as a non-limiting example, a high-temperature vapor seal system such as an airlock. This may allow the carbon source to penetrate the reactor while preventing gas and/or heat from escaping or from oxygen from entering. In certain embodiments, multiple purges may take place to refresh the gas and/or reduce the oxygen level in the reactor. It should be understood to control the purging process so that the temperature never falls below 120° C. to ensure the carbon-containing material stays dry prior to or during activation.

In an additional embodiments, the interior of the reactor is heated to a temperature of about 100° C., or about 200° C., or about 300° C., or about 400° C., or about 500° C., or about 600° C., or about 700° C., or about 800° C., or about 900° C., or about 1000° C., or about 1100° C., or about 1200° C., or about 1300° C. for 30 minutes to 24 hours, wherein at 700-1000° C. for 2-4 hours is more typical. The carbon source material undergoes a thermal process under nitrogen, helium, or argon atmosphere with nitrogen or argon being more practical, to activate the contacted carbon source at an activation temperature from 450° C. to 1300° C. for 10 minutes to 24 hours, with a temperature of 700-1000° C. for 2-4 hours being more usual, and a ramp rate of 10° C.

per minute to produce a predetermined pore size and distribution hierarchical structure activated carbon.

The activation process may result in heteroatom doping of activated carbons (for example, oxygen, nitrogen, sulfur, boron, phosphorus, etc.), depending on the synthesis procedures, dopant type, and carbon source. In some embodiments, activated carbon is co-doped with more than one heteroatom.

Once carbonized, the activated carbon may exit the reactor by means of an activated carbon feed system, which in certain embodiments is the same feed system as the carbon source feed system, and may enter a cooling zone then a washing or KOH recovery zone or device. In some embodiments, recovering the KOH is accomplished via a Nutsche filter and storage tanks after activation and cooling. In certain embodiments, heating the water used to recover the KOH increases the recovery percentage of the KOH. In certain embodiments the amount of water used to recover the KOH is minimized to ensure a concentrated KOH solution for future use. In additional embodiments the optimal amount of KOH recovered is the primary concern, wherein in these embodiments additional water may be used to recover additional KOH. In certain embodiments, evaporating water from the KOH mixture may be used to concentrate the KOH within the mixture for future use. In certain embodiments the system and method may reuse the KOH-water mixture to make more activated carbon.

In certain embodiments for washing the activated carbon, alternating water wash and citric acid washes may be utilized. In certain embodiments, water is heated from 50° C. to 80° C., wherein an exothermic reaction may naturally increase the temperature of the mixture by approximately 20° C. In some embodiments, washing the activated carbon utilizes citric acid which allows the use of stainless steel for the processing and handling equipment. In certain embodiments, HCl is used during washing which can improve performance. In certain embodiments, the concentration of citric acid is 0.1 to 20 molar. In certain embodiments, the acid may soak with the activated carbon material to provide better removal of impurities, for instance, 10 minutes to 48 hours, or 3-12 hours which is practical.

In certain embodiments a vacuum filtration system may be used. For instance, spraying or soaking the activated carbon mixture with water and then using a mesh with various hole sizes, for instance a non-limiting example of 5 μm holes to allow the water to pass through while trapping activated carbon particles, as well as allowing the maximum water flow during washing process. In certain embodiments the washing process continues until the water pH reaches 7.

Once carbonized, the activated carbon may exit the reactor by means of an activated carbon feed system, which in certain embodiments is the same feed system as the carbon source feed system, and may enter a cooling zone then a washing zone or be removed and placed in a separate device for washing.

At this stage, washing the activated carbon with water and an optional additive is possible, a non-limiting example of the exemplified additive such as an acid includes HCl, and citric acid which is preferred. In certain embodiments, washing and/or cooling may be accomplished in a controlled amount of time, for instance a time period of about 10 min, about 20 min, about 30 min, about 40 min, about 50 min, about 1 hour, about 1.5 hours, about 2 hours, about 3 hours, about 4 hours, about 5 hours, about 6 hours, about 7 hours, about 8 hours, about 9 hours, about 10 hours, about 11 hours, about 12 hours, about 13 hours, about 14 hours, about 15 hours, about 16 hours, about 17 hours, about 18 hours, about 19 hours, about 20 hours, about 21 hours, about 22 hours, about 23 hours, about 24 hours, about 25 hours, about 26 hours, about 27 hours, about 28 hours, about 29 hours, about 30 hours, about 31 hours, about 32 hours, about 33 hours, about 34 hours, about 35 hours, about 36 hours, about 37 hours, about 38 hours, about 39 hours, about 40 hours, about 41 hours, about 42 hours, about 43 hours, about 44 hours, about 45 hours, about 46 hours, about 47 hours, about 48 hours, about 49 hours, about 50 hours, or around 3-8 hours which is a practical example. In certain embodiments the cooling/washing zone may be the same reactor, and/or a different reactor or zone. In certain embodiments the cooling zone allows the activated carbon to cool before it is transported to a different zone or device to undergo the washing process.

In some embodiments, an aqueous solution of an additive such as a salt or an acid may be added to facilitate particle aggregation and further deposition of activated carbons, which may lead to a faster washing process. In some embodiments, the additive is HCl. In certain embodiments, an acid wash, for example HCl, may replace the first water washing step (KOH recovery), in which a potassium salt may be recovered rather than KOH. In some embodiments, to wash the activated mixture after the furnace, an aqueous solution of HCl is added to the mixture to decrease the pH below 6, followed by 0.5 to 12 hours of soak time, followed by filtration or removal of liquids. If the pH increases above 7 during the soaking process, additional acid solution is added to maintain the pH below 6. Then, the remaining mixture is further washed with water to remove residual impurities.

8. Method for Producing Activated Carbon for Energy Storage

For producing activated carbon for use with an electrolyte in an energy storge device, for example a device that uses a capacitor-type electrode (so called double-layer capacitance) such as a supercapacitor or battery-capacitor hybrid device, the activated carbon comprises a plurality of pores comprising micropores (pore size less than 2 nm), mesopores (pore size 2-50 nm), and macropores (pore size greater than 50 nm), and a corresponding method comprises:

(a) selecting the electrolyte from a group consisting of: a first electrolyte having a first average of solvated ion and/or de-solvated ion sizes equal to or less than 1 nm; a second electrolyte having a second average of solvated ion and/or de-solvated ion sizes greater than 1 nm;

(b) selecting an activation temperature and an activation time period such that: if the first electrolyte is selected, the activation temperature is in a range of 700 to 900° C. and the activation time period is in a range of 30 minutes to 4 hours; if the second electrolyte is selected, the activation temperature is in a range of 800 to 1000° C. and the activation time period is in a range of 30 minutes to 5 hours; and (c) activating a carbon source in the presence of at least nearly inert gas and at the activation temperature for the activation time period so as to produce the activated carbon such that the plurality of pores comprises micropores and mesopores and at least 0.001% of the pores being the macropores by volume.

The above method is more for supercapacitors, for example, because less porosity is needed for batteries and there is no need for wide pores. The upper temperature limit may be higher than what might normally be expected in the above method because the temperature depends on other conditions too, such as activating agent, ratio, duration, type of furnace, etc.

In the method, step (c) may include producing the activated carbon such that: if the first electrolyte is selected, 50% to 95% of the pores by volume are micropores, 5% to 50% of the pores by volume are mesopores, and 0.001% to 10% of the pores by volume are macropores; if the second electrolyte is selected, 40% to 80% of the pores by volume are micropores, 20% to 60% of the pores by volume are mesopores, and 0.1% to 10% of the pores by volume are macropores.

In an example, when the first electrolyte is selected, 50% to 95% of the pores by volume are micropores, 5% to 49% of the pores by volume are mesopores and 0.001% to 10% of the pores by volume are macropores. In another example, when the second electrolyte is selected, 50% to 80% of the pores by volume are micropores, 20% to 49% of the pores by volume are mesopores and 0.1% to 10% of the pores by volume are macropores.

In the method, step (c) may include producing the activated carbon such that: if the first electrolyte is selected, about 67% of the pores by volume are micropores, about 32% of the pores by volume are mesopores, about 1% of the pores by volume are macropores.

In the method, step (c) may include producing the activated carbon such that: if the first electrolyte is selected, the majority of micropores and mesopores have a pore size in the range of 0.1 nm to 6 nm; and if the second electrolyte is selected, the majority of micropores and mesopores have a pore size in the range of 0.5 nm to 10 nm, where the pore size distribution is obtained using a density functional theory (such as NLDFT or QSDFT) from the measurement of nitrogen adsorption/desorption at 77 K. (d) In the method, step (c) may include: producing a first powder by exposing the carbon source to an activating agent solution; activating the first powder to produce a second powder by heating the first powder at the activation temperature for the activation time period in an inert atmosphere; and producing a third powder by washing the second powder with water and acidic aqueous solution.

The method may further include at least one of drying, pre-carbonizing, and charring the carbon source prior to step (d).

In the method, step (d) may include exposing the carbon source to an activating agent solution being an aqueous solution of KOH.

In the method, step (d) may include exposing the carbon source to an activating agent solution, wherein the mass ratio of activating agent to the carbon source is in a range of 1:1 to 10:1.

In the method, step (d) may include exposing the carbon source to an activating agent solution for a time period ranging from 1 to 24 hours.

In the method, step (d) may include activating the first powder at the activation temperature of 700-900° C. for the activation time period of 2-4 hours when the electrolyte comprises water, a co-solvent, and a salt. Bear in mind that only the cation and anion sizes and/or their solvation sizes define the suitability of the pore size distribution.

In an embodiment of the method, the molar concentration of the co-solvent and salt electrolyte is in a range of 1 to 10 M.

In an embodiment of the method, the molar ratios of the salt, water, and co-solvent are in ranges of 0.5 to 2 for the salt, 0.5 to 3 for the water, and 1.5 to 4 for the co-solvent, respectively.

In an embodiment of the method, a step (e) comprises heating the first powder at a temperature that is increased at a heat ramping rate of 10° C. per minute prior to heating at the activation temperature.

In an embodiment of the method, step (e) comprises optionally preheating the furnace/reactor up to operational temperature prior to adding carbon material for the pyrolysis process, wherein carbon material is placed in the preheated furnace/reactor and allowed to reach the desired pyrolysis temperature.

In an embodiment of the method, step (e) comprises heating in the presence of said at least nearly inert gas selected from the group consisting of nitrogen, helium, and argon gas.

In an embodiment of the method, step (e) comprises optionally drying the first powder prior to activating the first powder.

The method optionally includes drying the first powder prior to activating the first powder, by drying at 60° C. or up to 200° C.

In an embodiment of the method, a step (f) comprises exposing the second powder to the acidic aqueous solution citric acid having a molar concentration of 4 M for a time period of 5 minutes to 24 hours, thereby producing a soaked powder.

In an embodiment of the method, step (f) further comprises washing the soaked powder in water to produce a washed powder, and then drying the washed powder.

9. Method for Producing Activated Carbon for Energy Storage Devices

A method of producing activated carbon for use in an energy storge device that uses an electrode other than capacitor-type electrode (so called double-layer capacitance), such as rechargeable batteries, comprises: the activation time period may be in a range of 0.5 to 4 hours, the activation temperature may be in a range of 450 to 1300° C., and the mass ratio of activating agent to the carbon source may be in a range of 1:1 to 4:1.

The energy storage device production system includes: a pre-determined pore configuration hierarchical structure activated carbon production system/zone; a carbon source feed system; a chemical soak/mixing zone; a preheating/drying zone; a pyrolysis reactor; and a cooling zone, which may also include a gas inlet and a gas outlet; a chemical washing zone; a dryer; an activated carbon recovery unit; an activated carbon material feed system; an energy storage device production system; an electrode mixing zone/system; an electrode preparation zone/system; an optional electrode drying zone/system; a device rolling/layering system; an electrolyte mixing zone/system; an electrolyte administering zone/system; and energy storage device affixing/sealing zone/system; capable of producing a finished energy storage device.

10. Grinding and Milling Particle Sizing

In certain embodiments, feedstock may be milled, ground, or a sized feedstock of desired diameter. In alternate embodiments it is desirable for the feedstock to be carefully milled or sized prior to thermal pyrolysis and/or activation, or subsequently after the thermal pyrolysis or activation has occurred. Additionally, by carefully controlling the initial treatment it will tend to preserve the carbon sources strength and cell-wall integrity that may be present in different carbon sources. This may be important for the final product in order to retain some, most, or all of the shape and strength of the pre-determined pore configuration activated carbon source's starting shape and strength.

The activated carbon and/or carbon source material may be ground, milled or formed into a powder or pellet, such as a course, fine, ultra-fine, or nano-sized, powder. As an example in certain embodiments, the activated carbon or input carbon material may be sorted using a sieve to a desired particle size range after grinding. In exemplary embodiments, the pre-determined pore configuration activated carbon has an average particle size of up to about 500 μm, for example less than or equal to about 0.1, about 1 μm, about 2 μm, about 3 μm, about 4 μm, about 5 μm, about 6 μm, about 7 μm, about 8 μm, about 9 μm, about 10 μm, about 11 μm, about 12 μm, about 13 μm, about 14 μm, about 15 μm, about 16 μm, about 17 μm, about 18 μm, about 19 μm, about 20 μm, about 21 μm, about 22 μm, about 23 μm, about 24 μm, about 25 μm, about 26 μm, about 27 μm, about 28 μm, about 29 μm, about 30 μm, about 35 μm, about 40 μm, about 45 μm, about 50 μm, about 75 μm, about 100 μm, about 200 μm, about 300 μm, about 400 μm, or about 500 μm.

In certain embodiments, the activated carbon may be formed into structural objects comprising pressed, bound, or agglomerated particles. The starting material to form these objects may be a powder form of the reagent, such as an intermediate obtained by particle size reduction. The desired shapes of the pre-determined pore configuration activated carbon may be formed by mechanical pressing or other forces, optionally with a binder or other means of agglomerating particles together, which may include a paste, paint, freestanding electrode or the like.

In alternate embodiments, the carbon source is prepared by milling, grinding, or pulverising, to form a plurality of carbon source pieces that are substantially uniform in size and substantially uniform shape. For example, and without limitation, the carbon source is processed to produce a fine particulate or particle size of approximately uniform size (e.g., a desired mesh size). Alternatively, the carbon source is processed to produce nano or micro sized particles having substantially uniform dimensions.

11. Cooling

In certain embodiments the activated carbon material may be introduced into a cooler. In certain embodiments, solids are collected and/or remain in the reactor and simply allowed to cool at slow rates. In certain embodiments, the carbonaceous and/or activated solids are reactive and/or unstable in air. In these embodiments it may be desirable to maintain an inert atmosphere and/or rapidly cool the solids to a temperature which may be less than or equal to about 20° C., about 30° C., about 40° C., such as ambient room temperature. In certain embodiments, a water quench may be employed for rapid cooling. In additional embodiments, a fluidized bed cooler may be employed. It should be noted that a "cooler" may be broadly construed to also include an assortment of different containers, tanks, pipes, or portions thereof. In certain embodiments it should be noted that the cooler may be distinct from the cooling unit and/or cooling reactor.

In certain embodiments, the process may further comprise operating the cooler to cool the warm activated solids with a gas or steam; this may result in generating cool activated carbon solids while generating a superheated steam. In this embodiment the drying portion may be carried out, at least in part, with the superheated steam derived from the cooler and/or cooling process. Additionally in some embodiments, the cooler may be operated to first cool the warm or hot activated carbon solids with a gas or steam to reach a lower cooler temperature, and then in certain embodiments with a gas or air to reach a second cooler temperature. It should be noted that the second cooler temperature is lower than the first cooler temperature and may be associated with a reduced combustion risk for the warm or hot pyrolyzed material or activated carbon in the presence of the air.

In certain embodiments, after cooling to ambient conditions, the carbon material may be recovered and stored, used, conveyed to another site operation, transported to another site, or otherwise disposed, traded, or sold. Additionally, the solids may be fed to a unit to reduce or sort the particle size, which may include a variety of size-reducing or sorting units that are known in the art, including crushers, shredders, grinders, pulverisers, jet mills, pin mills, and ball mills and drums, and planetary ball mills, air classifiers, mesh screens.

In various embodiments, the cooling zone is operated to cool down the activated carbon intermediate material to various temperatures. In certain embodiments, the temperature of the cooling zone is lower than that of the pyrolysis zone and/or activation zone. In additional embodiments, the temperature for the cooling zone is selected from a range of about 10° C. to about 500° C., such as about 10° C. to about 30° C.

In certain embodiments, chemical reaction(s) may continue to occur within the cooling zone. It should be noted that in various embodiments, secondary pyrolysis and/or activation reactions are initiated and/or allowed to occur in the cooling zone. Carbon source components that are presently in the gas phase may condense; this may be due to the reduced temperature of the cooling zone. In certain embodiments when the temperature remains sufficiently high, it will promote reactions that may form additional fixed carbon derived from and formed by the condensed liquids; this may be considered secondary activation and/or pyrolysis, and may at least form bonds between adsorbed species and the fixed carbon materials. In the above description one exemplary reaction that may take place is the conversion of carbon monoxide to carbon dioxide, plus fixed carbon, referred to as the Boudouard reaction.

In exemplary embodiments, when the activated carbon product enters the cooling zone, the material is allowed to cool (actively or passively) to a specified temperature. In an additional embodiment, the temperature of the activated carbon is reduced in the cooling zone within a substantially inert atmosphere. In an additional embodiment, the cooling zone may cool the activated carbon material with water cooling and may additionally include an additive such as HCl and/or citric acid, which may be a mechanical mechanism, and which may soak the material for a specified or extended period of time. It should be noted that the carbon material may be allowed to cool in the cooling zone, wherein it reaches a point where it will not undergo spontaneous combustion if exposed to normal atmosphere and/or oxygenated air. In an additional embodiment, the cooling zone reduces the temperature of the carbon material below 200° C. or about 150° C. or about 40° C. In exemplified embodiments, the device may include an optional mixing system to mix the activated carbon material, and/or coolant, and/or additive, which may allow for the uniform cooling of the activated carbon material. Additionally, cooling may occur by either direct or indirect means, which may be with water and/or other liquids or additives. Additionally, the cooling process may also occur by direct or indirect means with air or other gases, and/or a combination of both of the above.

In certain embodiments, the cooling mechanisms are separate from the reactors, and may be mechanically coupled to the activated carbon material feed system. In additional embodiments, the cooling mechanism is located after the reactors. In additional embodiments, the cooling mechanism may be the same as, or built into, the reactors. In additional embodiments, the cooling mechanism is comprised of, for non-limiting examples example, a screw, auger, conveyor which is specifically a belt conveyor, in certain embodiments, drum, screen, pan, counterflow bed, vertical tower, jacketed paddle, cooled screw, and/or a combination thereof, which cools by either direct or indirect means, and with water and/or other liquids/additives, and/or direct or indirectly with gases, and/or any combination of the above. In additional embodiments, the cooler(s) could include a water spraying mechanism or inlet port(s) (with or without an additive), a cooled inert gas stream mechanism and/or outlet port(s) which may be liquid nitrogen, or ambient air if below ignition and/or a combustible temperature. In additional embodiments heat may be recovered from or during this step, an example would be by capturing the flash steam generated by a water spray, and/or the superheated steam generated when a saturated steam is introduced, which may be mixed into and throughout, and may then heated by the activated carbon material. In additional embodiments the activated carbon material is allowed to cool in an unheated zone by normal heat dissipative means.

12. Material Feed System

In exemplified embodiments, the raw carbon source material, such as coal, petroleum coke, oil, biomass is introduced into the reactor in a low oxygen containing atmosphere, which may be accomplished optionally through the use of a material feed system as described. The material feed system may be used to reduce the oxygen level in the ambient air in the system to less than or equal to about 3%, 2%, 1%, or 0.1% which may accommodate the process of pyrolysis free of combustion. Raw carbon source material may enter the device in an enclosed material feed system, which may be after the oxygen levels have been decreased. In additional embodiments, the material feed system may include encapsulated jacket(s) or sleeve(s) through which steam and/or off-gases from the reactor are sent and/or used in the preheating of the carbon source material.

In additional embodiments, the raw carbon source material, and subsequently the dried carbon source, preheated carbon source and carbonized activated carbon material travel through the reactor and/or reactors, along a continuous material feed unit and/or system. In additional embodiments, the material feed system may carry the carbon source material which may differ at different stages in the process. In additional embodiments, the process of moving the material through the zones and/or reactors is a continuous process. In certain embodiments, the speed of the material feed system may be appropriately calibrated, calculated, and controlled by an associated controller and/or processor such that the operation of the material feed system does not require interruption as the material moves through the device and reactor zone and/or zones.

In certain embodiments, the material feed unit may be operationally sectioned, and may include a plurality of separate devices and/or augers, rotating tubes, or additional carbon material feed mechanisms as described in this disclosure.

In additional embodiments, a controller associated with the reactor, or reactors may be configured to adjust the speed of the material feed unit, which may be based on one or more feedback sensors, detected gas which may be from the optional FTIR, measured parameters, temperature gauges, and/or other suitable variables in the reactor or reaction process. It should be noted in additional embodiments, suitable moisture sensors, temperature sensors, or gas sensors in operable communication with the controller and/or processor may be integrated, or mechanically connected, into or between each of the zones and/or reactors or at any suitable position along the material feed unit or device. In additional embodiments, the controller and the processor may use the information obtained from the sensors and/or gauges by which to optimize the speed and efficiency of the device and/or processing systems. In additional embodiments, the controller which may be associated with the reactor and/or reactors is configured to operate the material feed unit.

In additional embodiments, the controller associated with the reactor or reactors may be configured to monitor the concentration, temperature, and moisture of the gas or material inside the material feed unit or inside any of the reactors and/or zones. In additional embodiments, the controller may be configured to adjust the speed of the material feed unit the input of gases into the material feed unit, and/or the heat applied to the material in the material feed unit, which may be based upon one or more readings taken by the various sensors.

It should also be noted that, in additional embodiments, the device is enclosed in a kiln shell to control and manipulate the high amounts of heat required for the reactor process and reactions to occur. In additional embodiments, the kiln shell of the device may include one or more, for example several insulating chambers which may surround a plurality of zones. In certain embodiments, the kiln includes a plurality of separate zones for the device. In additional embodiments, each of the zones of the device includes at least one inlet and at least one outlet. In additional embodiments, within each zone the inlet and outlets are configured to be adjustable in which to control the flow of carbon feed material, gas, and heat, into and out of the zone or zones. A supply of inert gas may be introduced into the inlet and the purged air may be extracted from the corresponding outlet. In additional embodiments, one or more of the outlets of a zone in the device are connected to one or more of the other inlets or outlets in the device. In additional embodiments a rotating furnace may be employed to control the movement of the carbon source material through the zone or zones, which based on the rotation and slope determines the feed rates and the residence times in each zone or zone of the activation process.

In an additional embodiment, the carbon source material may be fed into the material feed system which may be accomplished with a gravity-feed system. In certain embodiments the material feed system may be constructed such that the screw or auger and may be enclosed in a suitable enclosure. In additional embodiments, the described enclosure may be substantially cylindrical in shape. In additional embodiments, the material feed system may include a screw, auger, conveyor, rotating tube, drum, screen, chute, drop chamber, pneumatic conveyance device, which may also include a rotary airlock and/or a double or triple flap airlock.

In certain embodiments the carbon source material is fed from the carbon source material feed hopper to the material feed system, the auger, screw or tube is rotated, this rotation causes the moving of the raw carbon source material toward an optional oxygen purge manifold. It should be expressed that, when the carbon source material reaches the oxygen purge manifold, the ambient air among the raw carbon source material in the material feed system may include roughly about 21% oxygen. In additional embodiments, the oxygen purge may be arranged in such a manner to be adjacent to or around the material feed system, or be employed throughout the entire device or reactor such as a rotating tube. In certain embodiments the oxygen purge manifold, and/or the enclosure of the material feed unit may include a plurality of gas inlet ports and a plurality of gas outlet ports.

In certain embodiments where an auger is used, sand or another heat carrier can optionally be employed, as an example, the feedstock and sand can be fed at one end of a screw. The auger screw can mix the sand and feedstock and then convey them through the reactor. In this example the screw can provide control of the feedstock residence time and does not dilute the pyrolyzed material with a carrier or fluidizing gas, where the sand may be reheated in a separate vessel.

In certain embodiments, the device may utilize a rotating calciner or tube with or without a screw material feed system. In additional embodiments, some or all of the device is axially rotatable, for example it spins about its centerline axis, wherein the speed of rotation may impact the solid flow pattern, and heat and the mass transport. It should be noted that each of the zones may be configured with flights disposed on internal walls, which may provide agitation of solids, where the flights may be separately adjustable in each of the zones.

In additional embodiments, alternative means of agitating solids may be employed, such as augers, screws, or paddle conveyors. In certain exemplified embodiments, the device includes a single, continuous auger disposed throughout each of the zones. In additional embodiments, the device and/or reactor includes twin screws disposed throughout each of the zones.

In certain embodiments, the system may be designed specifically with the capability to maintain the approximate size of feed material throughout the process, in order to process the carbon source feedstock without destroying or significantly damaging its structure. In additional embodiments, the pyrolysis zone does not contain augers, screws, or rakes that may greatly reduce the size of feed material being pyrolyzed.

13. Drying and Preheat Zones

In additional embodiments, the carbon source material which may include an additive may first travel from the material feed system and through an optional drying and/or preheat zone or area of the device. In an additional embodiment, the optional drying zone may heat the material to remove water and other moisture or combustible gases/tars. This may be a separate zone and prior to the material being passed along into the separate preheat zone. In additional embodiments, the interior of the optional drying zone may be heated to a temperature of about ambient temperature to about 80° C. to about 150° C. to about 200° C. Water or moisture removed from the material may be exhausted, in one example from outlet ports from the optional drying zone or area. In an additional embodiment, the optional drying zone may be adapted to allow vapors, steam, and/or moisture, to be extracted. In an additional embodiment, vapors, steam, and/or moisture from the optional drying zone may be extracted for optional later use. This moisture, vapor, or steam, which has been extracted from the optional drying zone may be used in a suitable waste heat recovery system, which may be in conjunction with the material feed system. In an additional embodiment, the vapor, steam, and/or moisture, used in the material feed system may be used to preheat the materials while oxygen levels are being purged in or by the material feed system. In an additional embodiment, the material is dried outside of the reactor(s) and the reactor(s) do not comprise a drying zone.

In an additional embodiment, the dried material enters a preheat zone, wherein the temperature may be raised from the range of about ambient temperature to a temperature range of about 100° C., to about 150° C., or to about 200° C. In an additional embodiment, the temperature does not exceed 200° C. in the preheat zone. It should be appreciated that if the preheat zone is too hot, or subsequently not hot enough, then the dried carbon source material may be processed in a non-ideal manner prior to entering the reactor zone. The preheat zone may include an output mechanism to capture, for current or later reuse, exhaust off-gases from the dried material while it is being preheated. In additional embodiments, the off-gases may be extracted for optional later use. In additional embodiments, the heating source used for the various zones may be electric or gas. In additional embodiments, the heating source used for the various zones may be waste gas from other zones of the device and/or from the external source(s). In additional embodiments, the heat may be indirect.

In various alternate embodiments the material is prepared by drying, which may occur during one or more stages of the preparation and activation of the activated carbon, which may be over an extended period of time, for example over a period of time that is no less than 1 hour, no less than about 2 hours, no less than about 3 hours, no less than about 4 hours, no less than about 5 hours, no less than about 6 hours, no less than about 7 hours, no less than about 8 hours, no less than about 9 hours, no less than about 10 hours, no less than about 11 hours, no less than about 12 hours, no less than about 13 hours, no less than about 14 hours, no less than about 15 hours, no less than about 16 hours, no less than about 17 hours, no less than about 18 hours, no less than about 19 hours, no less than about 20 hours, no less than about 21 hours, no less than about 22 hours, no less than about 23 hours, or no less than about 24 hours; this may allow water and/or gases, to exit the material without destroying the structure of the feedstock and ensuring that oxidization is reduced.

In additional embodiments, the preheat zone and/or the carbon source feedstock hopper of the device may be configured for feeding coal, oil, petroleum coke, biomass, or another carbon-containing feedstock. This may additionally be done in a manner that does not "shock" the carbon source material, which may rupture the cell walls and initiate a fast decomposition of the solid phase which may result in vapors and gases. In an additional embodiment, the preheat zone may be considered to be a mild pyrolysis.

14. Activation Zone

After processing within the preheat zone, the material feed system may pass the preheated material into the reactor to undergo the pyrolysis and/or activation process. In an additional embodiment, the material feed system may penetrate the pyrolysis and/or activation zone which may be through a high-temperature vapor seal system, which may include a non-limiting example of an airlock, which may allow the material feed system to penetrate the high-temperature pyrolysis and/or activation reactor zone while preventing or minimizing gas from escaping, and/or oxygen from entering. In an additional embodiment, the interior of the pyrolysis zone and/or reactor is heated to a temperature of about 100° C., about 200° C., about 300° C., about 400° C., about 500° C., about 600° C., about 700° C., about 800° C., about 900° C., about 1000° C., about to 1100° C., or to about 700-1000° C. at a rate of 10° C. per minute, which is a practical example.

In additional embodiments, the pyrolysis and/or activation zone(s) may include outlet port(s) and inlet port(s) similar to the preheat zone(s) to capture and exhaust the gases which may be given off by the preheated carbon source material while it is being carbonized. In an additional embodiment, the gases may be extracted for optional later use at the discretion of the operator. In additional embodiments, the off-gases from the preheat zone(s) and the off-gases from the pyrolysis and/or activation zone(s) may be combined into a single gas stream. Once the material exits the pyrolysis and/or activation reactor zone and may then enter into a cooling and/or washing zone.

15. Off-Gases

In additional embodiments the preheating/drying zone may include a mechanism to capture and/or exhaust off-gases from the pre-soaked carbon source or material while it is being heated and/or dried. In additional embodiments, the off-gases can be extracted for optional use at a later time. In additional embodiments, the heating source used for the various mechanical systems is electrical or gas. In additional embodiments, the heating source used for the various zones is waste gas from other reactors or sections of the device and/or may be from external sources.

In one such embodiment, the raw material feed system may comprise an encapsulated jacket or sleeve by which steam and off-gases from the reactor are used to heat the carbon source material, directly, or used by a process gas heater and/or heat exchanger which is then used to preheat or pyrolyze the carbon source material.

In an additional embodiment, the reactor may comprise an output port to capture and exhaust gases given off, for instance from the preheated carbon source material while it is undergoing pyrolysis. In an additional embodiment, gases are extracted and stored for optional later use. In an additional embodiment, the off-gases from the reactor and the off-gases from a plurality of zones of the device may be combined into a single gas stream. In additional embodiments the off-gases are decomposed via combustion.

In certain embodiments, each zone and/or reactor is adapted to extract and collect off-gases from one or more of the individual zones and/or reactors. In additional embodiments, off-gases from each zone and/or reactor may remain separate for disposal, analysis and/or later use. In additional embodiments, each reactor and/or zone may contain a gas detection system such as an FTIR that can monitor gas formation within a zone and/or reactor. In additional embodiments, off-gases from a plurality of zones and/or reactors may be combined for disposal, additionally for analysis and/or later use, as well as off-gases from one or more zones and/or reactors can be fed to a process gas heater. In additional embodiments, off-gases from one or more zones and/or reactors may be fed into a carbon recovery unit. In an additional embodiment, off-gases from one or more zones and/or reactors may be fed to a gas-phase separator prior to the introduction in the carbon recovery unit.

In an additional embodiment, a gas-phase separator may comprise a fractionation column. Depending on the specific embodiment any fractionation column known to those skilled in the art may be used. In additional embodiments, off-gases may be separated into non-polar compounds and polar compounds which may be accomplished using a standard fractionation column which may be heated to a suitable temperature, and/or a packed column. In yet an additional embodiment, non-polar compounds and/or enriched gases from the gas-phase separator may be extracted for optional use at a later time. In additional embodiments, off-gases from one or more zones and/or reactors may be fed to a process gas heater for use. In additional embodiments, gases extracted from the preheat zone and/or reactor, the pyrolysis zone and/or reactor and optionally the cooling zone and/or reactor may be extracted into a combined stream and may be then fed into the gas-phase separator. In additional embodiments, one or more of the zones and/or reactors may be configured to control the flow and quantity of gas introduced into a combined stream or individual stream.

In certain embodiments the off-gases from the device are directed into the gas phase separator. In additional embodiments, the off-gases may include the extracted gases from the first preheat zone and/or reactor, and combined with the extracted gases from the second pyrolysis zone and/or reactor, or may be streamed off individually. As the off-gases enter the gas phase separator, the off-gases may be separated into polar compounds and non-polar compounds, such as non-polar gases. In additional embodiments, the gas phase separator may be a known fractionation column.

In certain embodiments, the enriched gases which have been extracted from the combined off-gases may be directed, from the gas-phase separator, into the carbon recovery unit via an input, which may be used to enrich the material. In additional embodiments, the extracted gases may be first introduced into a material enrichment unit, and then may be directed to a separate carbon recovery unit. In additional embodiments, the material enrichment may take place in the carbon recovery unit. In an additional embodiment, the gas-phase separator may include a plurality of outputs. In additional embodiments, one output from the gas-phase separator may be connected to the carbon recovery unit and may introduce an enriched gas stream to the carbon recovery unit. In an additional embodiment, a portion of the enriched gas stream may be directed to the carbon recovery unit and another portion may be directed to a scrubber, and/or another suitable purifying apparatus to clean and allow the disposal of unwanted gas. In additional embodiments, off-gases that have not been sent to the carbon recovery unit may be used for either energy recovery or as an inert gas as an example in the deaeration unit, reactor, device, or cooler. In additional embodiments, off-gases from the carbon recovery unit may be used for either energy recovery as an inert gas as an example in the deaeration unit, reactor, or cooler, or in a secondary recovery unit.

In additional embodiments, an additional output from the gas phase separator extracts polar compounds, which may be optionally condensed into a liquid component and/or form, this may include a plurality of different liquid parts. In additional embodiments, the described liquid may include water, acetic acid, methanol and furfural. In additional embodiments, the outputted liquid may be stored, disposed of, further processed, or re-used. An example of this would be water outputted in one portion of the device which can be re-used to heat or cool another portion of a device. In an additional embodiment, the water may be drained. In certain embodiments the acetic acid, methanol and furfural that may be outputted may be routed to storage tanks for re-use, re-sale, distillation or refinement.

In additional embodiments, the housing may be substantially free of convex comers. In an additional embodiment, the housing may be substantially free of convex corners capable of producing eddies and/or trapping air. In an additional embodiment, the housing may be substantially shaped like a cube, rectangular prism, ellipsoid, a stereographic ellipsoid, a spheroid, two cones affixed base-to-base, two regular tetrahedrons affixed base-to-base, two rectangular pyramids affixed base-to-base or two isosceles triangular prisms affixed base-to-base.

In an additional embodiment, the carbon recovery unit may comprise a path defined between the upper portion and the lower portion, an inlet opening and an outlet opening. In an additional embodiment, the inlet opening and the outlet opening may be configured to receive the transport feed system. In an additional embodiment, the transport system may be at least semi-permeable or permeable to the enriching gas.

In an additional embodiment, the inlet opening may include an inlet opening sealing mechanism which may reduce the escape of gas and the outlet opening may include an outlet opening sealing mechanism which may reduce the escape of gas. In an additional embodiment, the inlet and outlet opening sealing mechanisms may comprise an airlock.

16. Deoxygenation

In additional embodiments, after the raw carbon source material is deoxygenated in the material feed system, it may be introduced to the device, and specifically to the first zones and/or the optional drying zone. In certain embodiments the oxygen purge manifold may have at least one gas inlet line and at least one gas outlet line. In additional embodiments, the at least one gas inlet line of the oxygen purge manifold may be in operable communication and mechanically connected with each of the plurality of gas inlet ports. In additional embodiments, the at least one gas outlet line of the oxygen purge manifold may be in operable communication and mechanically connected with each of the plurality of gas outlet ports. In certain embodiments, the gas inlet line(s) may be configured to pump an inert gas into the gas inlet ports. In certain embodiments, the inert gas is nitrogen and/or argon and/or helium containing substantially no oxygen. In an additional embodiment, the inert gas flow is introduced counter-current to the carbon source material.

In certain embodiments, the introduction of an inert gas into the enclosed feed system may be used to force the ambient air out of the enclosed system. In certain embodiments when in operation, and when the inert gas is introduced to the first gas inlet port a quantity of oxygen-rich ambient air is forced out of an outlet port. It should be understood that, at this point, the desired level of less than or equal to about 2% oxygen, less than or equal to about 1% oxygen, less than or equal to about 0.5% oxygen or less than or equal to about 0.2% or less than or equal to about 0.1% oxygen may not be achieved.

In additional embodiments, additional infusions of the inert gas must be made in order to purge the requisite and/or desired amount of oxygen from the air surrounding the carbon source material in the enclosed system. In additional embodiments, the second gas inlet port may pump the inert gas into the enclosed system in concert with the infusion at the first gas inlet port, thereby allowing for the purging of partially or substantially more of the remaining oxygen from the enclosed system. It should be understood that after one or two or a plurality of infusions of inert gas to purge the oxygen, the desired result of lowering oxygen content percentage may be achieved, which may in additional embodiments require repeated purges. In additional embodiments, if the desired oxygen levels are still not achieved after two inert gas infusions, a plurality of infusions of inert gas may be used and may purge remaining undesired amounts of oxygen from the enclosed system at a gas outlet. Additional inlets and outlet pluralities may also be incorporated if desired. In additional embodiments, oxygen levels may be monitored throughout the material feed system to allow calibration of the amount and location of inert gas infusions to ensure desired performance, safety and resulting processed pre-determined pore configuration hierarchical structure activated carbon material.

In certain embodiments it should be noted that the gas inlet port(s) and the corresponding gas outlet port(s) respectively, are slightly offset from each other with respect to a vertical or horizontal bisecting plane through the material feed unit. In certain embodiments, inlet port(s) and corresponding outlet port(s) may be offset on the material feed system by an amount that approximately corresponds with the pitch of the auger in the material feed unit. In additional embodiments, after the atmosphere surrounding the material is deoxygenated to a predetermined or satisfactory level, it may then be fed from the material feed system into a reaction zone or zones. In additional embodiments, oxygen levels may be monitored throughout the material feed system to allow the calibration of the amount and location of inert gas infusions to allow pre-determined or desired levels.

In certain embodiments, the carbon source material comprises at least about 55 wt %, for example at least 55 wt %, at least 60 wt %, at least 65 wt %, at least 70 wt %, at least 75 wt %, at least 80 wt %, at least 85 wt %, at least 90 wt %, at least 95 wt. %, at least 96 wt %, at least 97 wt %, at least 98 wt %, or at least 99 wt % or at least 99+wt % total carbon on a dry basis. In these examples the total carbon includes at least 40 wt % fixed carbon and may further include carbon from volatile matter. In alternative embodiments, carbon from volatile matter is about at least 5%, at least 10%, at least 25%, or at least 50% of the total carbon present in the carbon. It should be noted fixed carbon may be measured using ASTM D3172, while volatile carbon may be estimated using ASTM D3175.

The activated carbon according to the present disclosure may comprise about 0 wt % to about 8 wt % hydrogen. In additional embodiments, the activated carbon comprises greater than about 0.5 wt % hydrogen, for example about 0.6 wt %, about 0.7 wt %, about 0.8 wt %, about 0.9 wt %, about 1 wt %, about 1.2 wt %, about 1.4 wt %, about 1.6 wt %, about 1.8 wt %, about 2 wt %, about 2.2 wt %, about 2.4 wt %, about 2.6 wt %, about 2.8 wt %, about 3 wt %, about 3.2 wt %, about 3.4 wt %, about 3.6 wt %, about 3.8 wt %, about 4 wt %, or greater than about 4 wt % hydrogen. The hydrogen content of an activated carbon may be determined by any suitable method known in the art, for example by the combustion analysis procedure outlined in ASTM D5373.

In certain embodiments, various amounts of non-combustible matter such as ash may be present. The pre-determined pore configuration activated carbon may comprise about 10 wt % or less, such as about 5 wt %, about 2 wt %, about 1 wt % or less than or equal to about 1 wt % of non-combustible matter on a dry basis. In additional embodiments, the activated carbon contains little ash, or even essentially no ash or other unwanted matter. In additional embodiments, provide for essentially pure activated carbon, including 95%-100% carbon, on a dry basis.

In certain embodiments, various amounts of moisture may be present, for a total mass basis, the pre-determined pore configuration activated carbon may comprise 0-1 wt %, at least 1 wt %, at least 2 wt %, at least 5 wt %, at least 10 wt %, at least 15 wt %, at least 25 wt %, at least 35 wt %, at least 50 wt %, or more than 50 wt % of moisture. As described herein, "moisture" is to be understood as including any form of water present in the pre-determined pore configuration activated carbon product, which may include absorbed moisture, adsorbed water molecules, chemical hydrates, and physical hydrates.

In certain embodiments, additives and/or catalysts may be utilized in the process, and temperature profiles within the device may be selected to promote activation and/or the production of carbon dioxide over carbon monoxide, this may be used to lead to a greater fixed carbon in the final product.

In certain embodiments the amount of additive, or total additives, may vary widely, such as from about 0.01 wt % to about 25 wt %, including about 0.1 wt %, about 1 wt %, about 5 wt %, about 10 wt %, or about 20 wt %, or about 30 wt %, or about 40 wt %, or about 50 wt % or about 60 wt % or about 70 wt % or about 80 wt % or about 90 wt % or about 100 wt % or about 200 wt % or about 300 wt % or about 400 wt % or about 500 wt % or about 600 wt % or about 700 wt % or about 800 wt % or about 900 wt % or about 1000 wt % or about 1100 wt % or about 1200 wt % on a dry basis.

In certain embodiments, the additive may be selected from an acid, a base, a salt, a metal, a metal oxide, a metal hydroxide, a metal halide, and/or a combination thereof. In additional embodiments, the additive may be selected from the group consisting of magnesium, manganese, aluminum, nickel, iron, chromium, silicon, boron, cerium, molybdenum, phosphorus, tungsten, vanadium, iron chloride, iron bromide, magnesium oxide, dolomite, dolomitic lime, fluorite, fluorspar, bentonite, calcium oxide, lime, sodium hydroxide, potassium hydroxide, hydrogen bromide, hydrogen chloride, sodium silicate, potassium permanganate, organic acids, citric acid, and/or combinations.

In certain embodiments, an additive may be used in various stages of the activated carbon production for instance pre-activation or post activation, which may assist in the activation processes or may assist in removing unwanted contaminants for instance during subsequent washing stages. This additive may be an acid, a base, a salt, a metal, a metal oxide, a metal hydroxide, a metal halide, and/or a combination thereof. In additional embodiments, the additive may be selected from the group consisting of magnesium, manganese, aluminum, nickel, iron, chromium, silicon, boron, cerium, molybdenum, phosphorus, tungsten, vanadium, iron chloride, iron bromide, magnesium oxide, dolomite, dolomitic lime, fluorite, fluorspar, bentonite, calcium oxide, lime, sodium hydroxide, potassium hydroxide, hydrogen bromide, hydrogen chloride, sodium silicate, potassium permanganate, organic acids, citric acid, and/or combinations. It should be noted multiple contaminants and/or impurities may be removed from the activated carbon particles.

17. Iron Particles

In certain embodiments, the activated carbon composition may include iron and/or an iron-containing compounds. This results in the material being susceptible to a magnetic field. In certain applications iron or an iron-containing compound may be separated using magnetic separation devices. In certain embodiments, the activated carbon, which contains iron, may be separated using magnetic separation; in these processes where magnetic separation is to be employed, magnetic metal separators may be magnet cartridges, plate magnets, or another known device and configuration.

18. Multiple Zones

As described in this disclosure, different embodiments of the disclosure are premised, at least in part, on the assumption that a single or multiple reactors and/or a single or multiple zones within a single reactor can be utilized and operated in such a way to optimize the activated carbon yielded, and the final product quality, this while maintaining certain amount of flexibility and adjustability for various feedstocks and desired product requirements.

19. Heat Rate

In alternate embodiments, the use of a slow progressive heat rate during pyrolysis (for example in contrast to flash pyrolysis) over minutes or hours, may be used to allow water and gases to exit the carbon source without destroying the structure of the feedstock. For example and without limitation, the rate of temperature may increase during the pyrolysis and/or activation process with a heating rate that may range from about 1° C. per minute to about 110° C. per minute, for example about 1° C. per minute, about 2° C. per minute, about 4° C. per minute, about 5° C. per minute, about 10° C. per minute, about 15° C. per minute, about 20° C. per minute, about 25° C. per minute, about 30° C. per minute, about 35° C. per minute, or about 40° C. per minute.

In some alternative embodiments, the temperature increase may occur in a preheat zone to produce a preheated carbon source feedstock. In additional alternative embodiments, the temperature increases and time periods for such an increase occur predominantly or entirely in a preheat zone to produce a preheated carbon source feedstock. In additional embodiments, the temperature of a preheated carbon source feedstock is increased in a pre-pyrolysis zone. In additional embodiments, the temperature increase occurs at least in part in the carbonization zone or the pyrolysis zone or the activation zone. In additional embodiments, the temperature increase occurs predominantly or entirely in the carbonization zone or the pyrolysis zone or the activation zone.

In additional embodiments, the preheat zone, the pre-pyrolysis zone, the carbonization zone or the pyrolysis zone or the activation zone is configured to increase the temperature during pyrolysis and/or activation initially, from a low temperature to the final, higher temperature over a specific period of time, which may then be lowered over a specific period of time.

In additional embodiments, the temperature increase is linear or substantially linear over a period of time. In alternate embodiments, the rate of temperature increases or decreases over time such that the temperature during the preheating, the pre-pyrolysis and/or the carbonization or the pyrolysis is at least partially nonlinear in operation, for example logarithmic or substantially logarithmic for at least a portion of the preheat, pre-pyrolysis and/or carbonization or pyrolysis or activation step or steps.

20. Condensate Material

In additional embodiments, the condensate material may include polar compounds examples of non-limiting examples include acetic acid, methanol and furfural. In additional embodiments, the enrichment gas that is produced by the gas-phase separator may include non-polar gases, non-limiting examples include carbon monoxide, terpenes, methane, carbon dioxide, etc. In additional embodiments, the gas phase separator may comprise a fractionation column. In an additional embodiment, acetic acid may be sent via a line or channel to an optional acid hydrogenation unit. In an additional embodiment, methanol and/or furfural may be sent via optional additional line(s) and/or channels to the distillation and/or processing unit.

21. Deaerator Dryer

In additional embodiments, the device may comprise an optional deaerator and an optional dryer. As an example, the optional deaerator may be connected to the system between the material feed system and the pyrolysis and/or activation reactor(s). In addition, the dryer may be connected to the system between the material soaking system and the pyrolysis and/or activation reactor(s) and/or between the washing and cooling system and the mixing system(s) or after such systems or devices. In additional embodiments, the dryer and/or deaerator may also be connected to one another such that the material from the material feed system may follow any number of different paths through the material feed system, the deaerator, the dryer, and to the pyrolysis and/or activation reactor(s). In certain embodiments, the material may only pass through one of the optional deaerator and/or dryer.

In additional embodiments, a deaeration unit may be utilized in which the carbon source material, before or after drying, is conveyed in the presence of another gas which may remove adsorbed oxygen and/or penetrate the feedstock pores which may remove oxygen from the pores. In certain embodiments, gases that have lower than 21 vol % $O_2$ may be used, which may have varying effectiveness. In certain embodiments, nitrogen may be employed. In certain embodiments, CO and/or $CO_2$ may be employed. In additional embodiments mixtures of gases may be used, such as a mixture of nitrogen and a small amount of oxygen as a mixture. In certain embodiments steam may be present in the deaeration gas, although for many embodiments adding significant moisture back to the carbon source material should be avoided. In certain embodiments the effluent from the deaeration unit may be purged which may be to the atmosphere or to an emissions treatment unit and/or recycled.

In certain embodiments, the effluent and/or a portion thereof, from the deaeration unit may be introduced into the pyrolysis and/or activation reactor itself since the oxygen removed from the solids may now be highly diluted. In this embodiment and additional embodiments, it may be advantageous to introduce the deaeration effluent gas to the last zone of the reactor, in this form the device may operate in a countercurrent configuration. In certain embodiments, if drying is performed, deaerating after drying may prevent the step of scrubbing soluble oxygen out of the moisture present. In additional embodiments, the drying and deaerating steps may be combined into a single unit and/or step, or some amount of deaeration may be achieved during drying.

22. Low-Oxygen Environment

In additional embodiments, it may be desirable to provide a relatively low-oxygen environment in the pyrolysis and/or activation reactor and during the process, such as about 10%, 5%, 3%, or 1% or less than 1% $O_2$ in the gas phase. It should be appreciated that uncontrolled combustion should be avoided in the pyrolysis reactor, one main reason is for safety. It should also be appreciated that some amount of total carbon oxidation to $CO_2$ may occur, and that heat released from the exothermic oxidation may assist the endothermic pyrolysis chemistry. During the pyrolysis process, large amounts of oxidation of carbon, including partial oxidation to syngas, may reduce the carbon yield to solids.

In certain embodiments, it can be difficult to achieve a strictly oxygen-free environment in each of the reactor(s) or the device. In certain embodiments, the reactor(s) and/or the device may be substantially free of molecular oxygen in the gas phase. In additional embodiments, and in order to ensure that little or no oxygen is present in the reactor(s) or device, it may be desirable to remove air from the carbon source material before it is introduced to the reactor(s) or the device.

23. Multiple Zones/Reactors

In additional embodiments, the systems may comprise multiple reactors and/or zones and may include an optional deaerator and an optional dryer. The device may also optionally include a material feed system, pyrolysis reactor, activation zone/reactor, cooling reactor, cooler and an activated carbon recovery unit. Additionally, a gas source may be configured to input gas into one or both of the pyrolysis reactor(s), activation reactor, and the cooling reactor. In additional embodiments, the pyrolysis reactor and/or activation reactor and may include an outlet to output at least the condensable vapors and/or non-condensable gases. In additional embodiments, the activated carbon recovery unit may include an outlet to output activated carbon from the system.

It should be noted that references to "zones" shall be broadly construed to include regions of space within a single physical unit and/or device, physically separate units and/or devices, and/or any combination thereof. For a device, the demarcation of zones within that device may relate to structure, such as the presence of flights within the device or distinct heating elements to provide heat to separate zones. In additional embodiments, the demarcation of zones in a device may relates to function, such as at least: distinct temperatures; fluid flow patterns; solid flow patterns; and extent of reaction. In alternate embodiments, and for a single batch reactor, "zones" are operating regimes in time, rather than in space. Additional embodiments include the use of multiple batch devices and/or system and method.

In certain embodiments, it should be understood that there are not necessarily abrupt transitions from one zone to another or a subsequent zone. As an example, the boundary between the preheating zone and pyrolysis zone and/or activation zone and/or cooling zone may be somewhat arbitrary, wherein a certain amount of pyrolysis ad or activation may take place in a portion of the preheating zone, and a certain amount of "preheating" may continue to take place in the pyrolysis and/or activation zone. In certain embodiments the temperature profile in the device is typically continuous, including at zone boundaries within the zone and/or zones.

Throughout this disclosure all references to zone temperatures should be construed in a non-limiting way to include temperatures that may apply to the bulk solids present, or the gas phase, or the reactor or device walls which may be on the process side. It should be noted that there will be a temperature gradient in each zone, both axially and radially, as well as temporally, meaning following start-up or due to transients. Thus, throughout this disclosure references to zone temperatures may be references to average temperatures and/or other effective temperatures that may influence the actual kinetics of the system. Physical temperatures may be directly measured by thermocouples or other temperature probes, or indirectly measured or estimated by other means and at varying or predetermined times.

24. Pyrolysis Reactor Zone and Temperature

In certain embodiments the second zone, and/or the primary pyrolysis and/or activation zone, which may comprise two independent zones, stages, or units, may be operated under conditions to produce pyrolysis and/or carbonization and/or activated carbon. In certain embodiments the temperature of the pyrolysis reactor and/or zone may be selected from about 250° C. to about 1300° C., such as about 300° C., 350° C., 400° C., 450° C., 500° C., 550° C., 600° C., or 650° C., or 700° C., or 750° C., or 800° C., or 850° C., or 900° C., or 950° C., or 1000° C., or 1050° C., or 1100° C., or 1150° C., or 1200° C., or 1250° C., or 1300° C., or about 700°-1000° C.

25. Residence Times

In certain embodiments the residence times of the zones may vary; this may be for a desired amount of pyrolysis, where higher temperatures may allow for lower reaction times, and vice versa. It should be understood that the residence time in a continuous device and/or reactor is the volume divided by the volumetric flow rate. It should also be understood that the residence time in a batch reactor is the batch reaction time, following the heating to the desired reaction temperature.

Additionally, it should be noted that in multiphase devices, there are multiple residence times. In this disclosure and in the present context, for each zone, there will be a residence time with a residence-time distribution, for both the solids phase and the vapor phase. In certain embodiments and for a given device employing multiple zones, and with a given throughput, the residence times for the zones will generally be coupled on the solids side requirements and/or feed rate, but residence times may be uncoupled on the vapor side results and feed rates when multiple inlet and outlet ports are utilized in individual zones. It should also be noted that in certain embodiments, the solids and vapor residence times may be uncoupled.

In certain embodiments, the solids residence time of a preheating zone may be selected from about 5 minutes to about 1440 minutes (or a day), such as about 120 minutes which may depend on the temperature and time required to reach a desired preheat temperature. It should be understood that the heat transfer rate, which will generally depend on the particle type and size, the physical apparatus, and on the heating parameters, will generally dictate the minimum residence time necessary to allow the solids to reach a predetermined or specified preheat temperature.

In certain embodiments, the solids residence time of the pyrolysis and/or activation reactor and/or zone(s) may be selected from about 5 minutes to about 1440 minutes (a day), such as about 20 minutes, 30 minutes, 45 minutes, 60 minutes, 75 minutes, 90 minutes, 105 minutes, 120 minutes, 135 minutes, 150 minutes, 200 minutes, 300 minutes, 400 minutes, 500 minutes, 600 minutes, 700 minutes, 800 minutes, 900 minutes, 1000 minutes, 1100 minutes, 1200 minutes, 1300 minutes, 1440 minutes, or about 120 minutes. It should be noted that depending on the pyrolysis and activation temperature in the reactor and/or zone(s), one should consider and ensure that sufficient time to allow the carbonization and activation chemistry to take place is reached. In certain embodiments, and for times below about 10 minutes, in order to remove high quantities of non-carbon elements, in general the temperature would need to be quite high, such as an example of above 800° C., which depending on the residence times may control the activation limitation or benefit. Generally, this temperature would promote a fast pyrolysis and therefore its generation of vapors and gases derived from the carbon source, this is generally to be avoided when the intended product is solid carbon.

In certain embodiments, the solids residence time of the cooling zone may be selected from about 5 minutes to about 1440 minutes (a day), such as about 120 minutes. Dependent upon the cooling temperature in the reactor and/or zone, there needs to be sufficient time to allow the carbon material to cool to the desired temperature. It should be understood that the cooling rate and temperature will dictate the minimum residence time necessary to allow the carbon to be cooled.

In certain embodiments, the residence times of the process phases may be separately selected and controlled. In certain embodiments the vapor residence time of the preheating zone may be selected from about 0.01 minutes to about 120 minutes, such as about 1 minutes. In certain embodiments the vapor residence time of the pyrolysis zone may be selected from about 0.01 minutes to about 240 minutes, such as about 120 minutes. In certain embodiments the vapor residence time of the cooling zone may be selected from about 0.01 minutes to about 150 minutes, such as about 10 minutes. It should be noted that a short vapor residence time will generally promote fast sweeping of volatiles out of the system, while generally longer vapor residence times tend to promote reactions of components in the vapor phase with the solid phase.

26. Continuous Vs. Batch

It should be understood that the mode of operation for the device, reactor, and/or zones, and overall system, may be continuous, semi-continuous, batch, or any combination or variation. In certain embodiments, the device is a continuous, countercurrent reactor device in which solids and vapor flow are generally substantially in the same or in opposite directions. The device may also be operated in batch but with simulated countercurrent flow of vapors, such as by periodically introducing and removing gas phases from the batch vessel, which may be used by the device or stored for later use.

In certain embodiments various flow patterns may be desired and constructed. In alternate embodiments, the chemical reactions and simultaneous separations involving multiple phases in multiple zones, the fluid dynamics, generally, can be quite complex. In certain embodiments the flow of solids may be well-mixed in the radial dimension for instance in a rotating tube furnace, while the flow of vapor may be well-mixed in both radial and axial dimensions. In certain embodiments multiple inlet and outlet ports for vapor may contribute to the overall mixing.

27. Pressure

In additional embodiments, the pressure in each zone may be separately selected and controlled. In additional embodiments the pressure of each zone may be independently selected from about 0.1 kPa to about 6000 kPa, such as about 101.3 kPa which is normal atmospheric pressure and may additionally comprise the activation zone in a vacuum atmosphere. In certain embodiments, independent zone control of pressure may be possible when multiple gas inlets and outlets are used, this may include vacuum ports to withdraw gas when a zone has pressure less than or equal to about atmospheric, which may be desired. In additional embodiments such as in a multiple reactor system, the pressure in each reactor may be independently selected and controlled.

In certain embodiments, the process may be operated at standard atmospheric pressure. It should be understood that there are many advantages associated with operation at a standard atmospheric pressure, this includes aspects such as mechanical simplicity and enhanced safety. In additional embodiments, the pyrolysis zone is operated at a pressure of about 90 kPa, 95 kPa, 100 kPa, 101 kPa, 102 kPa, 105 kPa, or 110 kPa, these being absolute pressures.

In certain embodiments operating under a vacuum such as 10-100 kPa may be used to allow fast sweeping of volatiles out of the system. In additional embodiments operating at higher pressures, 100-1000 kPa may be used when the device off-gases are fed to a high-pressure operation or portion of the device. It should be noted that elevated pressures may also be used to allow heat transfer, chemistry, or separations throughout the device and for heat and energy recycling.

28. Sweep Gas

In additional embodiments, the step of separating at least a portion of the condensable vapors and at least a portion of the non-condensable gases from the hot pyrolyzed solids may be accomplished within the reactor itself, and/or using a distinct separation unit or devices. In additional embodiments, a substantially inert sweep gas may be introduced into one or more of the zones, which may be used to force condensable vapors and non-condensable gases to be carried away from the zone(s) in the sweep gas, and out of the device.

In alternate embodiments, the sweep gas may be $N_2$, Ar, CO, $CO_2$, $H_2$, $H_2O$, $CH_4$, and/or other light hydrocarbons, and/or combinations thereof. In certain embodiments, the sweep gas may first be preheated prior to introduction, or cooled if it is obtained from a heated source or from an elevated temperature zone.

In additional embodiments, the sweep gas may be used to remove the volatile components, for instance by forcing them out of the system before they can condense or further react. It should be noted that the sweep gas can allow volatiles to be removed at higher rates than would be attained merely from volatilization at a given process temperature, and additionally the use of the sweep gas can allow milder temperatures to be used to remove a certain quantity of volatiles. It should also be understood that the reason the sweep gas improves the volatiles removal is that the mechanism of separation is not merely relative volatility but instead the liquid and/or vapor phase disengagement assisted by the sweep gas.

It should be understood that it is important to remove gases laden with volatile organic carbon from subsequent processing stages and/or prevent them from remaining in the pyrolysis reactor; this is in order to produce a product with high fixed carbon and purity. Generally, without removal, the volatile carbon may be adsorbed or absorb onto the pyrolyzed solids, thereby requiring additional energy and/or cost to achieve a purer form of carbon. In certain embodiments, by removing vapors quickly, it is also possible that the porosity may be enhanced in the pyrolyzing solids.

In alternative embodiments, sweep gas in conjunction with a relatively low process pressure, such as standard atmospheric pressure, may provide for fast vapor removal without large amounts of inert gas.

In certain embodiments, the sweep gas may flow countercurrent to the flow direction of feedstock. In additional embodiments, the sweep gas may flow concurrent to the flow direction of feedstock. In alternative embodiments, the flow pattern of solids may approach plug flow while the flow pattern of the sweep gas, and gas phase generally, may approach fully mixed flow in one or more zones.

In certain embodiments the sweep may be performed in any one or more of the device's zones. In additional embodiments, the sweep gas may be introduced into the cooling zone and extracted in conjunction with volatiles that have been produced from or in the cooling and/or pyrolysis zones. In certain embodiments, the sweep gas may be introduced into the pyrolysis zone and/or extracted from the pyrolysis and/or preheating zones. In certain embodiments, the sweep gas may be introduced into the preheating zone and/or extracted from the pyrolysis zone. In certain embodiments, the sweep gas may be introduced into each of the preheating, pyrolysis, and cooling zones and/or also extracted from each of the zones independently or in concert.

In certain embodiments, the zone and/or zones in which separation is carried out is a physically separate unit or device from the main device. In some embodiments the separation unit or zone may be located between zones, as an example, there may be a separation unit located between pyrolysis and cooling zones.

In certain embodiments the sweep gas may be introduced continuously, especially when the solids flow is continuously processed. In certain embodiments when the pyrolysis reaction is operated as a batch process, the sweep gas may be introduced after a certain amount of time, or periodically, in order to remove volatiles. It should be noted that even when the pyrolysis reaction is operated continuously, the sweep gas may be introduced semi-continuously and/or periodically, which may be with suitable valves and controls.

In some embodiments the volatiles containing sweep gas may exit from the one or more zones, and then may be combined, even if obtained from multiple zones. It should be understood that the resulting gas stream, containing various vapors, may be fed to a process gas heater for control of air emissions, and additionally any known thermal oxidation unit may be employed. In certain embodiments, the process gas heater may be fed with natural gas and air, to reach sufficient temperatures for substantial destruction of volatiles contained therein.

In some embodiments the effluent of the process gas heater may be a hot gas stream comprising water, carbon dioxide, and nitrogen. Additionally, the effluent stream may be purged directly to air emissions. In certain embodiments, the energy content of the process gas heater effluent may be recovered, for instance in a waste heat recovery unit. In additional embodiments, the energy content may also be recovered for instance by a heat exchange with another stream. In certain embodiments the energy content may be utilized by directly or indirectly heating, or assisting with heating, a unit elsewhere in the process, an example being a dryer or the reactor. In certain embodiments the device may be constructed to allow essentially all of the process gas heater effluent to be used for indirect heating for instance for the dryer, or additionally the process gas heater may consume fuels other than natural gas.

29. Screen or Mesh

In certain embodiments using a screen and/or mesh and/or some other means for separation based on particle size may be incorporated into the device. In some embodiments a portion of the screened material, for instance larger pieces, may be returned to the grinding portion. In certain embodiments, the cooled pyrolyzed material is ground into a fine powder which may be as small as about the micrometer size range, which may be a pulverized carbon or activated carbon product.

30. Additives

In alternate embodiments, various additives may be introduced throughout the process, before, during, and/or after any step disclosed throughout this disclosure. The various additives can be broadly classified as the process additives, which may be selected to improve one or more properties of the activated carbon material, or a downstream product incorporating a reagent.

In certain embodiments, an additive may be introduced before, during, or after one or more of the steps and/or to the electrolyte, and the additive may be selected from an acid, a base, a salt, a metal, a metal oxide, a metal hydroxide, a metal halide, iodine, an iodine compound, or a combination thereof. In additional embodiments, the additive may be selected from the group consisting of magnesium, manganese, aluminum, nickel, iron, chromium, silicon, boron, cerium, molybdenum, phosphorus, tungsten, vanadium, iron chloride, iron bromide, magnesium oxide, dolomite, dolomitic lime, fluorite, fluorspar, bentonite, calcium oxide, lime, sodium hydroxide, potassium hydroxide, hydrogen bromide, hydrogen chloride, sodium silicate, potassium permanganate, organic acids, iodine, an iodine compound, sodium perchlorate, organic perchlorate salts ammonium, alkali metal and alkali earth perchlorates, transition metal perchlorates and/or combinations thereof.

In additional embodiments, additives may be added at any suitable time during the entire process or processes. In certain embodiments without limitation, the additive may be added: before, during or after a feedstock drying step; before, during or after a feedstock deaerating step; before, during or after a pyrolysis step; before, during or after an activation step; before, during or after a separation step; before, during or after any cooling step; before, during or after an activated carbon recovery step; before, during or after a pulverizing step; before, during or after a sizing step; before, during or after an application, forming, or applying step; and/or before, during or after a packaging step. It should be noted that additives may be incorporated at or on feedstock supply facilities, transport trucks, unloading equipment, storage bins, conveyors and including open or closed conveyors, dryers, process heaters, or any other units, devices or processing equipment. It should also be noted that additives may be added throughout the pyrolysis process itself, this may require using suitable means for introducing additives, and they may also be added after carbonization, pulverization, meshing, mixing and/or during an application stage.

31. Oxidizer

Additionally, a vapor stream may be removed at least in part from the reactor and may be optionally fed into the hopper, and then may be fed into a thermal oxidizer. Additionally, a heat exchanger may enable heat from the emissions of the thermal oxidizer to heat a gas stream, which in some embodiments may comprise nitrogen and/or carbon dioxide and/or argon. In some embodiments the gas stream, or a portion thereof, may be recycled via a path and/or channel to the reactor, and/or optionally to the carbon source material before entry into the reactor. In certain embodiments off-gases can be disposed of according to standard methods, for example through a stack and/or burn.

In certain embodiments at least a portion of the optionally thermally oxidized and optionally adjusted vapor stream which was produced by a reactor, thermal oxidizer and heat exchanger may be fed counter-currently into a second reactor. Additionally, at least a portion of the off-gases from a second reactor may be recycled to indirectly heat the second reactor. In certain embodiments, portions of the off-gases that have not been recycled, such as by heat, may be disposed of, for instance by a stack.

32. Graphitic Regions

In additional embodiments, at least a portion of the activated carbon may be present in the form of graphitic regions. Additionally, the activated carbon may be responsive to an externally applied magnetic field. Additionally, the activated carbon may have a higher electrical conductivity and/or capacitance from the starting carbon source material.

In certain embodiments, the present disclosure provides a continuous process for producing graphite, the process may comprise: (a) providing a carbon source feedstock comprising coal, oil, petroleum coke, biomass, or combination thereof; (b) optionally drying said feedstock in order to remove at least a portion of moisture from said material; (c) in one a plurality of indirectly heated reaction zone(s), mechanically conveying said carbon source material and counter currently contacting the said carbon source material with a vapor stream which may comprise a substantially inert gas and an activation agent including at least one of water or carbon dioxide or KOH, to generate carbon solids, condensable vapors, and non-condensable gases, wherein said condensable vapors and said non-condensable gases may enter said vapor stream; (d) removing at least a portion of said vapor stream from said the reaction zone(s), in order to generate a separated vapor stream; (e) recycling at least a portion of the said separated vapor stream, or the thermally treated form thereof, to said feedstock prior to step (c) and/or to a gas inlet of said the reaction zone(s); and (f) recovering at least a portion of said carbon solids from said the reaction zone(s) as graphite.

In different embodiments, the process capacity and/or throughput, may vary widely from small laboratory scale production to full scale commercial bio-refineries, including any pilot, demonstration, or semi-commercial scale production facility. In additional embodiments, the process capacity is at least about 0.1 kg a day, 1 kg a day, 10 kg a day, 100 kg a day, 1 ton a day where all tons are metric tons, 10 tons a day, 100 tons a day, 500 tons a day, 1000 tons a day, 2000 tons a day, 10,000 tons a day, 50,000 tons a day, or higher.

33. Types of Reactors

As possible examples the pyrolysis reactor or reactors may be selected from any suitable reactor configuration which is capable of carrying out the pyrolysis process. Exemplary reactor configurations may include non-limiting examples of a rotating tube furnace, box furnace, fixed-bed reactors, fluidized-bed reactors, entrained-flow reactors, augers, rotating cones, rotary drum kilns, calciners, roasters, moving-bed reactors, transport-bed reactors, ablative reactors, rotating cones, or microwave-assisted pyrolysis reactors.

34. Fluidized Bed Reactor

In additional embodiments where a fluidized-bed reactor is used, the feedstock may be introduced into a bed of hot sand fluidized by a gas, this is typically a recirculated product gas. As examples the reference to “sand” is meant to include similar, substantially inert materials, such as glass particles, recovered ash particles, and similar materials. As referenced, high heat-transfer rates from fluidized sand or similar materials can result in rapid heating of the feedstock. There may be some ablation by attrition with the sand or similar particles. Heat may be provided by heat-exchanger tubes where hot combustion gas flows.

Circulating fluidized-bed reactors may be employed, wherein gas, sand or similar material, and feedstock move together. Examples of exemplary transport gases include recirculated product gases and/or combustion gases. Wherein the high heat-transfer rates from the sand ensure rapid heating of the feedstock, and ablation may be expected to be stronger than with standard fluidized beds. It should be noted separator(s) may be employed to separate the product gases from the sand and/or char particles. It should be noted that the sand particles can be reheated in a fluidized burner vessel and recycled to the reactor.

35. Micropore Description

The activated carbon is, or may be, composed of; about 1%, about 2%, about 3%, about 4%, about 5%, about 6%, about 7%, about 8%, about 9%, about 10%, about 11%, about 12%, about 13%, about 14%, about 15%, about 16%, about 17%, about 18%, about 19%, about 20%, about 21%, about 22%, about 23%, about 24%, about 25%, about 26%, about 27%, about 28%, about 29%, about 30%, about 31%, about 32%, about 33%, about 34%, about 35%, about 36%, about 37%, about 38%, about 39%, about 40%, about 41%, about 42%, about 43%, about 44%, about 45%, about 46%, about 47%, about 48%, about 49%, about 50%, about 51%, about 52%, about 53%, about 54%, about 55%, about 56%, about 57%, about 58%, about 59%, about 60%, about 61%, about 62%, about 63%, about 64%, about 65%, about 66%, about 67%, about 68%, about 69%, about 70%, about 71%, about 72%, about 73%, about 74%, about 75%, about 76%, about 77%, about 78%, about 79%, about 80%, about 81%, about 82%, about 83%, about 84%, about 85%, about 86%, about 87%, about 88%, about 89%, about 90%, about 91%, about 92%, about 93%, about 94%, about 95%, about 96%, about 97%, about 98%, about 99%, of total pores by volume being the pores with average sizes less than 2 nm (micropores). In some embodiments, 30-95% of pores by volume in the activated carbon are micropores. In exemplified embodiments, 60-80% of pores by volume in the activated carbon are micropores.

36. Mesopore Description

The activated carbon is, or may be, composed of; about 1%, about 2%, about 3%, about 4%, about 5%, about 6%, about 7%, about 8%, about 9%, about 10%, about 11%, about 12%, about 13%, about 14%, about 15%, about 16%, about 17%, about 18%, about 19%, about 20%, about 21%, about 22%, about 23%, about 24%, about 25%, about 26%, about 27%, about 28%, about 29%, about 30%, about 31%, about 32%, about 33%, about 34%, about 35%, about 36%, about 37%, about 38%, about 39%, about 40%, about 41%, about 42%, about 43%, about 44%, about 45%, about 46%, about 47%, about 48%, about 49%, about 50%, about 51%, about 52%, about 53%, about 54%, about 55%, about 56%, about 57%, about 58%, about 59%, about 60%, about 61%, about 62%, about 63%, about 64%, about 65%, about 66%, about 67%, about 68%, about 69%, about 70%, about 71%, about 72%, about 73%, about 74%, about 75%, about 76%, about 77%, about 78%, about 79%, about 80%, about 81%, about 82%, about 83%, about 84%, about 85%, about 86%, about 87%, about 88%, about 89%, about 90%, about 91%, about 92%, about 93%, about 94%, about 95%, about 96%, about 97%, about 98%, about 99%, of total pores by volume being the pores with average sizes 2 nm or larger than 2 nm (mesopores), in certain embodiments. In some embodiments, 5-70% of pores by volume in the activated carbon are mesopores. In exemplified embodiments, 20-40% of pores by volume in the activated carbon are mesopores. Additionally, in some embodiments, the pore size distribution of the activated carbon is between 0.5 nm and 6 nm.

37. Macropore Description

The activated carbon is, or may be composed of, an average pore size that is; about 0.1%, about 0.2%, about 0.3%, about 0.4%, about 0.5%, about 0.6%, about 0.7%, about 0.8%, about 0.9%, about 1%, about 2%, about 3%, about 4%, about 5%, about 6%, about 7%, about 8%, about 9%, about 10%, about 11%, about 12%, about 13%, about 14%, about 15%, about 16%, about 17%, about 18%, about 19%, about 20%, about 21%, about 22%, about 23%, about 24%, about 25%, about 26%, about 27%, about 28%, about 29%, about 30%, about 31%, about 32%, about 33%, about 34%, about 35%, of total pores by volume being the pores that are larger than 50 nm (macropores) or larger in size in certain embodiments.

38. Conductive Additive

Additionally, an energy storage device with an electrode composition that includes the activated carbon may also comprise a conductive additive which may include: carbon black, Super P™, furnace black, channel black, acetylene black, thermal black, lamp black, conductive carbon. The weight percentage is between 0.01% and 25% wt % conductive additive in certain embodiments. The weight percentage is between 0.01% and 15% wt % conductive additive in some embodiments. The weight percentage of conductive additives is between 0%-2% in some embodiments, and in additional embodiments the conductive additive is acetylene black.

39. Mixing Agent

In certain embodiments the energy storage device's electrode has a composition that includes the activated carbon and may also comprise a mixing agent(s) which may include 2-propanol, sec-propyl alcohol, IPA, isopropyl, isopropanol, alcohol, and/or water. The weight percentage is between 0% and 25% mixing agent(s) in certain embodiments. Wherein the weight percentage is between 0% and 10% wt % mixing agent(s) in some embodiments.

40. Binder

Additionally, the energy storage devices electrode may also include a binder which may include polyvinylidene fluoride (PVDF), polytetrafluoroethylene (PTFE), non-reactive thermoplastic fluoropolymer(s), copolymers, terpolymers, plastics composite, or a binder, with PVDF (ink type electrode) and PTFE (freestanding electrode). The binder and active materials may be used to form a supercapacitor electrode mix, paint, mixture, paste, ink, or freestanding electrode composite. The percentage by weight is between 0.5% and 25% of the binder(s) in certain embodiments. The percentage by weight is between 1% and 15% wt % binder (s) in some embodiments. The percentage by weight of the binder(s) is about 6-12% wt % polytetrafluoroethylene (PTFE) in some embodiments.

41. Current Collector

Additionally, embodiments of the improved energy storage device, and/or supercapacitor, may utilize a variety of metals, and/or conductive material, for the current collector. These may include non-limiting examples of titanium, stainless steel of various grades, aluminum, zinc, copper, lead, chromium, lithium, vanadium, ruthenium, beryllium, sodium, magnesium, scandium, potassium, calcium, manganese, molybdenum, lanthanum, barium, bismuth, cobalt, niobium, nickel, zirconium, gallium, yttrium, rubidium, strontium, cesium, technetium, antimony, osmium, rhodium, indium, palladium, silver, gold, cadmium, thallium, hafnium, mercury, tantalum, tin, platinum, tungsten, iridium, rhenium, conductive carbon structure or sheet, graphene, composites and blends of various thicknesses, foils, mesh, interconnection structure, or grade. Both the electrode and conductive material may be a variety of thicknesses from 3 μm up to and including 200 μm, and a variety of foils, mesh, various patterns, or weaves.

42. Separator

Additionally, the energy storage device may also include ion permeable separator(s) which may include porous plastics, paper, fibers, cellulose, ion permeable insulators/separators. The ion permeable separator or separators may be a variety of thicknesses from 1 μm up to 200 μm with 30 μm being a practical example, and include a variety widths, lengths, and porosities.

43. Electrolyte

Additionally, the energy storage device also includes an electrolyte which may be a number of electrolytes including aqueous electrolytes, organic electrolytes, high-concentration electrolytes, co-solvent in (and) salt electrolytes, ion carriers electrolytes, ionic liquid electrolytes, gel electrolytes, hybrid electrolytes, dry polymer electrolytes, ceramic electrolytes, solid-state electrolyte. in certain exemplary embodiments, the electrolyte may include a co-solvent in (and) salt electrolyte with a molar ratio of 1/1.5/2.7 (salt/water/acetonitrile), i.e. 7.25 molal solution of sodium perchlorate ($NaClO_4$) in water/acetonitrile. In additional embodiments, the organic electrolyte may include a solution of tetraethylammonium tetrafluoroborate (TeaBF) in acetonitrile.

44. Examples

FIG. 6 is an SEM image of raw coal. FIGS. 7-9 are SEM images of activated carbon produced from thermal coal by a process of the present invention. The SEM images of activated carbons show the morphology of activated carbon with plenty of macropores. This is important for supercapacitor applications because macropores provide electrolyte reservoirs and ensure effective penetration of electrolyte into micropores and mesopores. Also, macropores provide short diffusion distances for electrolyte ions within the activated carbon particles.

FIGS. 10-11 are SEM images of activated carbon produced from petroleum coke by a process of the present invention. FIGS. 12-13 are TEM (transmission electron microscopy) images of activated carbon produced from petroleum coke by a process of the present invention. The TEM images confirm the amorphous structure and the well-developed micro-porosity and meso-porosity in the activated carbon.

FIGS. 14-17 are electrochemical performance graphs of supercapacitors made using activated carbon from a process of the present invention. To evaluate the electrochemical performance of activated carbons, supercapacitors were assembled in a symmetric two-electrode system (CR2032 coin cell), in which two identical electrodes were sandwiched between two stainless-steel current collectors and separated by one separator. Electrodes were prepared by mixing 85 wt % activated carbons with 10 wt % of PTFE and 5% carbon black. The hybrid electrolyte was a 7.3 m solution of $NaClO_4$ in water/acetonitrile (salt/water/acetonitrile molar ratio of 1/1.5/2.7). The organic electrolyte was 1 M tetraethylammonium tetrafluoroborate ($Et_4NBF_4$) in acetonitrile and the cells with organic electrolyte were assembled in a glovebox. The capacitance was calculated from the galvanostatic charge/discharge measurements.

Figure 14:
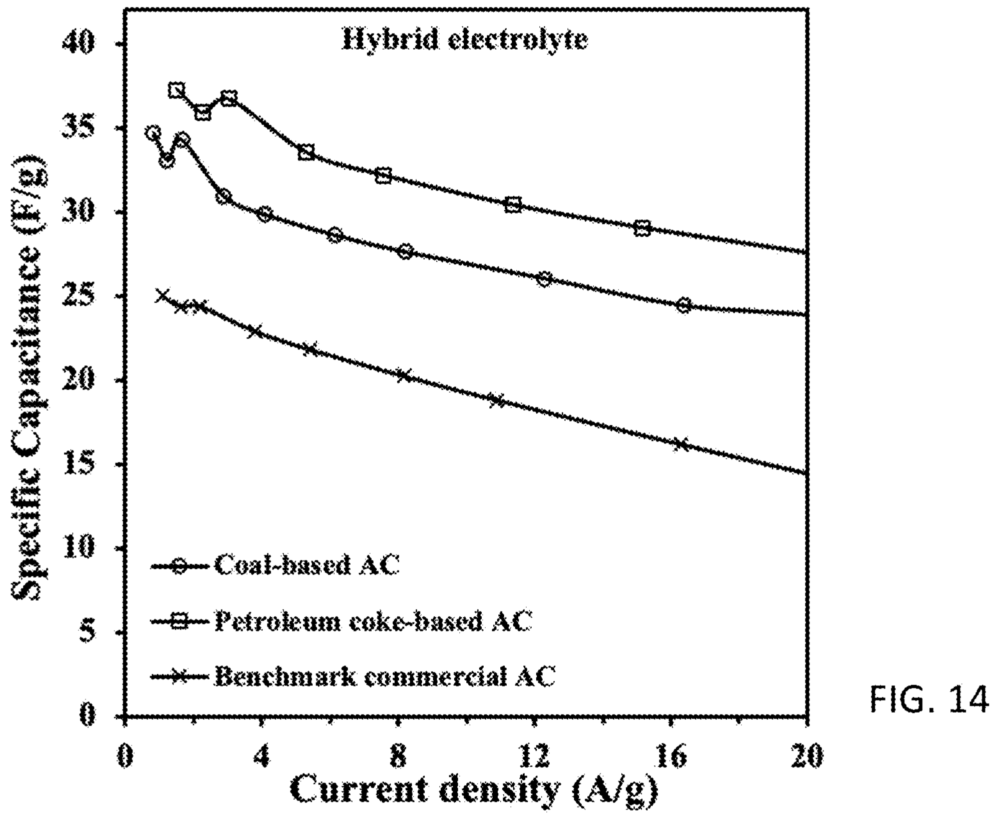
FIGS. 14-17 are performance graphs of supercapacitors made using activated carbon from a process of the present invention.
Figure 15:
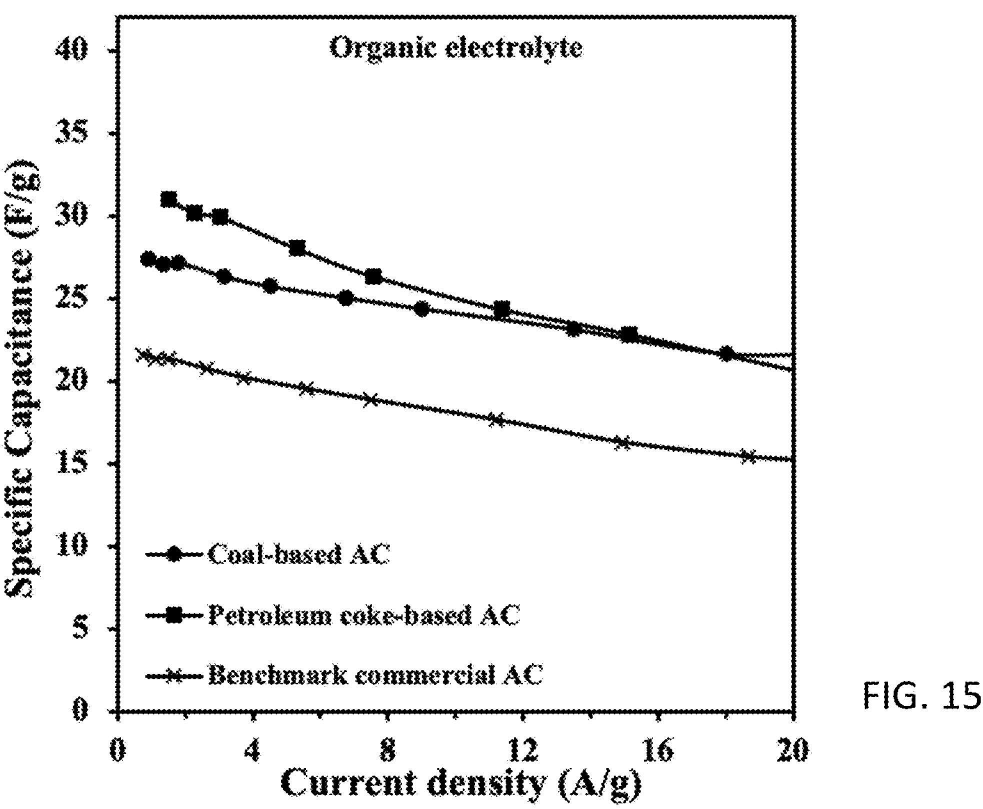
Figure 16:
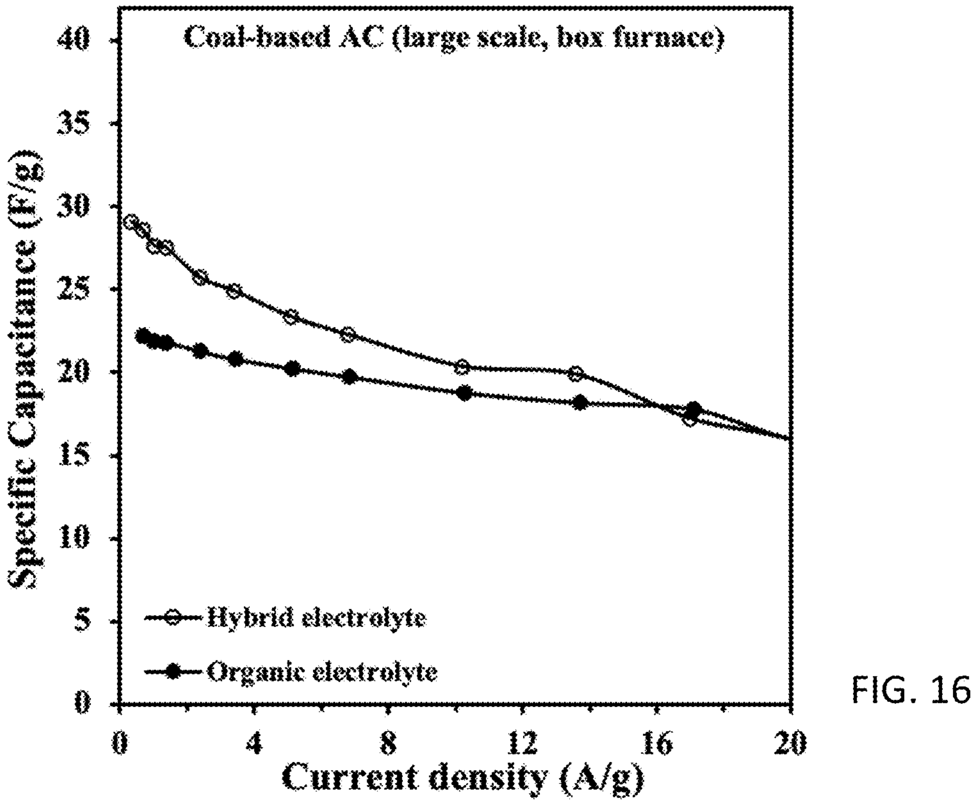
Figure 17:
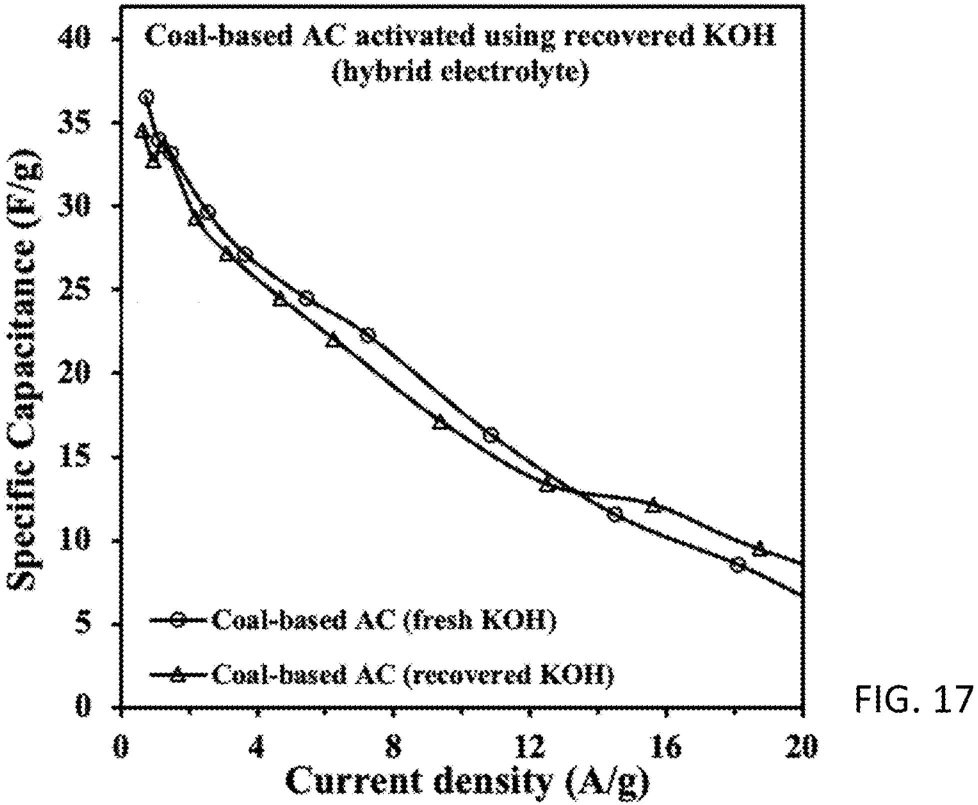

The graphs show the specific capacitance versus current density for coin cell supercapacitors that were assembled using different activated carbons with hybrid electrolyte and organic electrolyte. FIG. 14 is a performance comparison of activated carbon prepared from coal and petroleum coal to a benchmarked commercial activated carbon (YP50) for a hybrid electrolyte. FIG. 15 is a performance comparison of activated carbon prepared from coal and petroleum coal to a benchmarked commercial activated carbon (YP50) for an organic electrolyte. FIG. 16 is the capacitance of large scale activated carbon prepared from coal in a box furnace for both hybrid electrolyte and organic electrolytes. FIG. 17 is a performance comparison of a supercapacitor with hybrid electrolyte and the activated carbon prepared from coal using recovered KOH that was obtained from a previous and similar activation process.

45. Numbered Embodiments

1. A process for manufacturing activated carbon, comprising, in order, the steps of:
   (a) mixing a powder of carbonaceous source material with an activating agent to form a mixture;
   (b) drying the mixture at a temperature of 20° C. to below 400° C. to result in a dried mixture;
   (c) stirring the mixture repeatedly during step (b);
   (d) heating the dried mixture to 450-1300° C. under an inert atmosphere to result in an activated mixture;
   (e) washing the activated mixture in water to remove some or all of the activating agent;
   (f) washing the activated mixture with a washing agent;
   (g) washing the activated mixture with additional water to result in a washed activated mixture; and
   (h) drying the washed activated mixture to result in the activated carbon.

2. The process of embodiment 1, wherein the activating agent comprises further water and potassium hydroxide (KOH).
3. The process of embodiment 2 wherein a ratio in the mixture of the KOH to the carbonaceous source material is 1:1 to 10:1 by weight.
4. The process of embodiment 2 wherein a ratio in the mixture of the KOH to the carbonaceous source material is 2:1 to 4:1 by weight.
5. The process of embodiment 2 wherein the mixture has a ratio of the further water to the KOH of 0.5-20 liters to 1 kg.
6. The process of embodiment 2 wherein the mixture has a ratio of the further water to the KOH of 0.5-1 liter to 1 kg.
7. The process of embodiment 2 comprising:
   salvaging the KOH removed by step (e); and
   using the salvaged KOH for manufacturing further activated carbon.
8. The process of embodiment 1, wherein the carbonaceous source material comprises coal, petroleum coke, polymers, natural biomass or a combination selected therefrom.
9. The process of embodiment 1, wherein the inert atmosphere is nitrogen or argon.
10. The process of embodiment 1, wherein the washing agent is citric acid.
11. The process of embodiment 10, wherein the citric acid has a concentration of 0.01-20 molar.
12. The process of embodiment 10, wherein the citric acid has a concentration of 0.01-10 molar.
13. The process of embodiment 1 further comprising, prior to step (a), pre-carbonizing the carbonaceous source material.
14. The process of embodiment 1, further comprising prior to step (a), grinding pieces of the carbonaceous source material to obtain the powder, wherein the powder has a particle size below 250 μm.
15. The process of embodiment 1, further comprising prior to step (a), grinding pieces of the carbonaceous source material to obtain the powder, wherein the powder has a particle size below 150 μm.
16. The process of embodiment 1, wherein step (a) comprises soaking the powder in the activating agent for 10 minutes to 50 hours.
17. The process of embodiment 1, wherein step (a) comprises soaking the powder in the activating agent for 2-24 hours.
18. The process of embodiment 1, further comprising spreading the mixture in layers less than 3 cm thick for step (b).
19. The process of embodiment 18, wherein the activating agent comprises further water and potassium hydroxide (KOH), the process further comprising blending KOH that is precipitated on the layers back into the mixture during step (c).
20. The process of embodiment 1, further comprising spreading the mixture in layers less than 2 cm thick for step (b).
21. The process of embodiment 20, wherein the activating agent comprises further water and potassium hydroxide (KOH), the process further comprising blending KOH that is precipitated on the layers back into the mixture during step (c).
22. The process of embodiment 1, wherein step (b) is at a temperature of 20-80° C.
23 The process of embodiment 1, wherein step (b) is at a temperature of 40-80° C.
24. The process of embodiment 1, wherein step (b) is at a temperature of 80-390° C. and under an inert atmosphere.
25. The process of embodiment 1, wherein step (b) is at a temperature of 40-150° C.
26. The process of embodiment 1, wherein step (b) is at a temperature of 40-150° C. and under an atmosphere of air.
27. The process of embodiment 1, wherein step (b) is at a temperature of 80-200° C. and under an inert atmosphere.
28. The process of embodiment 1, wherein step (b) is in a stream of air at a temperature of 40-150° C. for a period of 1-10 days.
29. The process of embodiment 1, wherein step (b) is under a partial vacuum.
30. The process of embodiment 1, wherein step (d) is to a temperature of 500-1000° C.
31. The process of embodiment 1, wherein step (d) is to a temperature of 600-1000° C.
32 The process of embodiment 1, wherein step (d) is to a temperature of 700-1000° C.
33. The process of embodiment 1, wherein step (d) has a duration of 30 minutes to 24 hours.
34. The process of embodiment 1, wherein step (d) has a duration of 0.5-4 hours.
35. The process of embodiment 1, wherein step (d) has a duration of 2-4 hours.
36 The process of embodiment 1, wherein the dried mixture is ramped up in temperature for step (d) at 1-110° C. per minute.
37. The process of embodiment 1, wherein step (f) is for a duration of 0.1 hours to 2 days.
38. The process of embodiment 1, wherein step (f) is for a duration of 0.5-12 hours.
39. The process of embodiment 1, wherein step (f) is for a duration of 0.5-3 hours.
40. The process of embodiment 1, wherein step (f) is for a duration of 3-8 hours.
41. The process of embodiment 1, further comprising, between steps (c) and (d), heating the dried mixture to 300-430° C. for 1-8 hours under another inert atmosphere.
42. The process of embodiment 1, further comprising, between steps (c) and (d), heating the dried mixture to 380-420° C. for 1-3 hours under another inert atmosphere.
43. The process of embodiment 1, further comprising grinding the mixture after step (c).
44. The process of embodiment 1, further comprising interrupting step (d) to purge the inert atmosphere, while maintaining the mixture above a temperature of 120° C.
45. The process of embodiment 1, wherein the water has a temperature of 20-100° C.
46. The process of embodiment 1, wherein the water has a temperature of 50-80° C.
47. The process of embodiment 1, wherein step (g) is repeated until the additional water that has been used in step (g) has a pH=7.
48. The process of embodiment 1 wherein the additional water has a temperature of 20-95° C. and step (g) has a duration of 10 minutes to 12 hours.

49. The process of embodiment 1, wherein step (d) is to a temperature of 700-900° C. and has a duration of 30 minutes to 4 hours, the process further comprising:
   selecting an electrolyte having an average of solvated ion and/or de-solvated ion sizes equal to or less than 1 nm; and
   using the activated carbon with the electrolyte to make an energy storage device that uses a capacitor-type electrode;
   wherein the activated carbon comprises pores consisting of:
      micropores, having a pore size less than 2 nm;
      mesopores, having a pore size of 2-50 nm; and
      macropores, having a pore size greater than 50 nm;
   wherein at least 0.001% by volume of the pores are the macropores.
50. The process of embodiment 49, wherein:
   50% to 95% of the pores by volume are the micropores;
   5% to 50% of the pores by volume are the mesopores; and
   0.001% to 10% of the pores by volume are the macropores.
51. The process of embodiment 49, wherein a majority of the micropores and the mesopores have a pore size in the range of 0.1 nm to 6 nm.
52. The process of embodiment 49, wherein the energy storage device is a supercapacitor or a hybrid battery-capacitor.
53. The process of embodiment 1, wherein step (d) is to a temperature of 800-1000° C. and has a duration of 30 minutes to 5 hours, the process further comprising:
   selecting an electrolyte having an average of solvated ion and/or de-solvated ion sizes greater than 1 nm; and
   using the activated carbon with the electrolyte to make an energy storage device that uses a capacitor-type electrode;
   wherein the activated carbon comprises pores consisting of:
      micropores, having a pore size less than 2 nm;
      mesopores, having a pore size of 2-50 nm; and
      macropores, having a pore size greater than 50 nm;
   wherein at least 0.001% by volume of the pores are the macropores.
54. The process of embodiment 53, wherein:
   40% to 80% of the pores by volume are the micropores;
   20% to 60% of the pores by volume are the mesopores; and
   0.1% to 10% of the pores by volume are the macropores.
55. The process of embodiment 53, wherein a majority of the micropores and the mesopores have a pore size in a range of 0.5 nm to 6 nm.
56. The process of embodiment 53, wherein the energy storage device is a supercapacitor or a hybrid battery-capacitor.
57. Activated carbon made by the process of embodiment 1.

46. Further Variations

Other temperatures and durations for the activation step may be used in other embodiments.

Weak acids other than citric acid may be used for washing the activated carbon, provided that they do not react with the stainless steel.

In some embodiments, the raw material is ground and sieved to a particle size below a limit that is less than 250 μm. In some embodiments, the raw material is ground and sieved to a particle size between 0.5 μm to 250 μm. In some embodiments, the raw material is ground and sieved to a particle size between 0.5 μm to 150 μm. In some embodiments, the raw material is ground and sieved to a particle size between 50 μm to 150 μm. In some embodiments, the raw material is ground and sieved to a particle size between 50 μm to 250 μm.

Embodiments, depending on their configuration, may exhibit all or fewer than all of the advantages described herein. Other advantages not mentioned may be present in one or more of the embodiments.

Features from any of the embodiments may be combined with features from any of the other embodiments to form another embodiment within the scope of the invention.

All parameters, dimensions, angles, materials, quantities and configurations described or shown herein are examples only and may be changed depending on the specific embodiment implemented. Temperatures that have been given to the nearest degree include all temperatures within a range of 10° C. of the given value. Likewise, numbers and percentages are specified to the nearest significant digit. All ranges given include all subranges within the range. For example, if a range is given as m-q, then the ranges m-n, n-p and p-q are included, where n and p are any values that satisfy $m<n<p<q$. In general, unless otherwise indicated or clear from the context, singular elements may be in the plural and vice versa with no loss of generality.

Within this specification and claims, the singular forms "a," "an," and "the" may include plural forms unless the context clearly indicates the use of a singular form. Unless clearly indicated otherwise, all technical, scientific, and descriptive terms used herein have the same meaning as their commonly used and forms understood by one with ordinary skill in the art.

Unless specifically indicated, all referenced numbers expressing a reaction condition(s), stoichiometries, concentrations of components, and so forth that have been used in the specification and claims are to be interpreted as being modified or considered in all instances by the term "about." Also, unless specifically indicated to the contrary, the numerical parameters or ranges set forth in the specification and claims are expressed as approximations that may vary depending upon a specific or alternative analytical technique.

The FIGURES include block diagrams of exemplified embodiments of the invention, including general blocks and zones of the device, wherein blocks may be omitted or reconfigured in order to accomplish the beneficial aspects of the invention. Additionally, the FIGURES describe zones or blocks with specific features/devices/processes and benefits described throughout the document are hereby incorporated into the blocks or zones of the described invention depicted in figure. The FIGURES are in no way meant to limit the device's systems, zones, blocks, or benefits of the disclosed invention.

It will be clear to one having skill in the art that further variations to the specific details disclosed herein can be made, resulting in other embodiments that are within the scope of the invention disclosed.

Throughout the description, specific details have been set forth in order to provide a more thorough understanding of embodiments of the invention. However, the invention may be practised without these specific details. In other instances, well known elements have not been shown or described in detail and repetitions of steps and features have been omitted to avoid unnecessarily obscuring the invention. Accordingly, the specification and drawings are to be regarded in an illustrative, rather than a restrictive, sense. It will be clear to one having skill in the art that variations to the details disclosed herein can be made, resulting in other embodiments that are within the scope of the invention disclosed.

The invention claimed is:

1. A process for manufacturing activated carbon, comprising, in order, the steps of:

(a) mixing a powder of carbonaceous source material with an activating agent to form a mixture, wherein the activation agent comprises potassium hydroxide (KOH), sodium hydroxide (NaOH), calcium carbonate ($CaCO_3$), potassium carbonate ($K_2CO_3$), sodium carbonate ($Na_2CO_3$), phosphoric acid ($H_3PO_4$), zinc chloride ($ZnCl_2$), copper chloride ($CuCl_2$) and/or potassium permanganate ($KMnO_4$);

(b) drying the mixture at a temperature of 20° C. to below 400° C. to result in a dried mixture;

(c) stirring the mixture repeatedly during step (b);

(d) heating the dried mixture to 450-1300° C. under an inert atmosphere to result in an activated mixture;

(e) washing the activated mixture in water to remove some or all of the activating agent;

(f) washing the activated mixture with citric acid;

(g) washing the activated mixture with additional water to result in a washed activated mixture; and (h) drying the washed activated mixture to result in the activated carbon.

2. The process of claim 1, wherein the activating agent comprises further water and potassium hydroxide (KOH).

3. The process of claim 2 wherein a ratio in the mixture of the KOH to the powder is 1:1 to 10:1 by weight.

4. The process of claim 2 wherein a ratio in the mixture of the KOH to the powder is 2:1 to 4:1 by weight.

5. The process of claim 2 wherein the mixture has a ratio of the further water to the KOH of 0.5-20 liters to 1 kg.

6. The process of claim 2 wherein the mixture has a ratio of the further water to the KOH of 0.5-1 liter to 1 kg.

7. The process of claim 2 comprising:

salvaging the KOH removed by step (e); and using the salvaged KOH for manufacturing further activated carbon.

8. The process of claim 1, wherein the carbonaceous source material comprises coal, petroleum coke, polymers, natural biomass or a combination selected therefrom.

9. The process of claim 1, wherein the inert atmosphere is nitrogen or argon.

10. The process of claim 1, wherein the citric acid has a concentration of 0.01-20 molar.

11. The process of claim 1, wherein the citric acid has a concentration of 0.01-10 molar.

12. The process of claim 1 further comprising, prior to step (a), pre-carbonizing the carbonaceous source material.

13. The process of claim 1, further comprising prior to step (a), grinding pieces of the carbonaceous source material to obtain the powder, wherein the powder has a particle size below 250 μm.

14. The process of claim 1, further comprising prior to step (a), grinding pieces of the carbonaceous source material to obtain the powder, wherein the powder has a particle size below 150 μm.

15. The process of claim 1, wherein step (a) comprises soaking the powder in the activating agent for 10 minutes to 50 hours.

16. The process of claim 1, wherein step (a) comprises soaking the powder in the activating agent for 2-24 hours.

17. The process of claim 1, further comprising spreading the mixture in layers less than 3 cm thick for step (b).

18. The process of claim 17, wherein the activating agent comprises further water and potassium hydroxide (KOH), the process further comprising blending KOH that is precipitated on the layers back into the mixture during step (c).

19. The process of claim 1, further comprising spreading the mixture in layers less than 2 cm thick for step (b).

20. The process of claim 19, wherein the activating agent comprises further water and potassium hydroxide (KOH), the process further comprising blending KOH that is precipitated on the layers back into the mixture during step (c).

21. The process of claim 1, wherein step (b) is at a temperature of 20-80° C.

22. The process of claim 1, wherein step (b) is at a temperature of 40-80° C.

23. The process of claim 1, wherein step (b) is at a temperature of 80-390° C. and under an inert atmosphere.

24. The process of claim 1, wherein step (b) is at a temperature of 40-150° C.

25. The process of claim 1, wherein step (b) is at a temperature of 40-150° C. and under an atmosphere of air.

26. The process of claim 1, wherein step (b) is at a temperature of 80-200° C. and under an inert atmosphere.

27. The process of claim 1, wherein step (b) is in a stream of air at a temperature of 40-150° C. for a period of 1-10 days.

28. The process of claim 1, wherein step (b) is under a partial vacuum.

29. The process of claim 1, wherein step (d) is to a temperature of 500-1000° C.

30. The process of claim 1, wherein step (d) is to a temperature of 600-1000° C.

31. The process of claim 1, wherein step (d) is to a temperature of 700-1000° C.

32. The process of claim 1, wherein step (d) has a duration of 30 minutes to 24 hours.

33. The process of claim 1, wherein step (d) has a duration of 0.5-4 hours.

34. The process of claim 1, wherein step (d) has a duration of 2-4 hours.

35. The process of claim 1, wherein the dried mixture is ramped up in temperature for step (d) at 1-110° C. per minute.

36. The process of claim 1, wherein step (f) is for a duration of 0.1 hours to 2 days.

37. The process of claim 1, wherein step (f) is for a duration of 0.5-12 hours.

38. The process of claim 1, wherein step (f) is for a duration of 0.5-3 hours.

39. The process of claim 1, wherein step (f) is for a duration of 3-8 hours.

40. The process of claim 1, further comprising, between steps (c) and (d), heating the dried mixture to 300-430° C. for 1-8 hours under another inert atmosphere.

41. The process of claim 1, further comprising, between steps (c) and (d), heating the dried mixture to 380-420° C. for 1-3 hours under another inert atmosphere.

42. The process of claim 1, further comprising grinding the mixture after step (c).

43. The process of claim 1, further comprising interrupting step (d) to purge the inert atmosphere, while maintaining the mixture above a temperature of 120° C.

44. The process of claim 1, wherein the water has a temperature of 20-100° C.

45. The process of claim 1, wherein the water has a temperature of 50-80° C.

46. The process of claim 1, wherein step (g) is repeated until the additional water that has been used in step (g) has a pH=7.

47. The process of claim 1 wherein the additional water has a temperature of 20-95° C. and step (g) has a duration of 10 minutes to 12 hours.

48. The process of claim 1, wherein step (d) is to a temperature of 700-900° C. and has a duration of 30 minutes to 4 hours, the process further comprising:

selecting an electrolyte having an average of solvated ion and/or de-solvated ion sizes equal to or less than 1 nm; and using the activated carbon with the electrolyte to make an energy storage device that uses a capacitor-type electrode;

wherein the activated carbon comprises pores consisting of:

micropores, having a pore size less than 2 nm;

mesopores, having a pore size of 2-50 nm; and macropores, having a pore size greater than 50 nm;

wherein at least 0.001% by volume of the pores are the macropores.

49. The process of claim 48, wherein:

50% to 95% of the pores by volume are the micropores;

5% to 50% of the pores by volume are the mesopores; and 0.001% to 10% of the pores by volume are the macropores.

50. The process of claim 48, wherein a majority of the micropores and the mesopores have a pore size in the range of 0.1 nm to 6 nm.

51. The process of claim 48, wherein the energy storage device is a supercapacitor or a hybrid battery-capacitor.

52. The process of claim 1, wherein step (d) is to a temperature of 800-1000° C. and has a duration of 30 minutes to 5 hours, the process further comprising:

selecting an electrolyte having an average of solvated ion and/or de-solvated ion sizes greater than 1 nm; and using the activated carbon with the electrolyte to make an energy storage device that uses a capacitor-type electrode;

wherein the activated carbon comprises pores consisting of:

micropores, having a pore size less than 2 nm;

mesopores, having a pore size of 2-50 nm; and macropores, having a pore size greater than 50 nm;

wherein at least 0.001% by volume of the pores are the macropores.

53. The process of claim 52, wherein:

40% to 80% of the pores by volume are the micropores;

20% to 60% of the pores by volume are the mesopores; and 0.1% to 10% of the pores by volume are the macropores.

54. The process of claim 52, wherein a majority of the micropores and the mesopores have a pore size in a range of 0.5 nm to 6 nm.

55. The process of claim 52, wherein the energy storage device is a supercapacitor or a hybrid battery-capacitor.

56. Activated carbon made by the process of claim 1.

* * * * *